(12) United States Patent
Tanaka et al.

(10) Patent No.: US 9,369,074 B2
(45) Date of Patent: Jun. 14, 2016

(54) ELECTRIC POWER SUPPLY SYSTEM

(75) Inventors: Yuuya Tanaka, Tokyo (JP); Masaki Yamada, Tokyo (JP); Shigeki Harada, Tokyo (JP); Hiroshi Okuda, Tokyo (JP); Nobuhiro Kihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 14/116,518

(22) PCT Filed: Feb. 15, 2012

(86) PCT No.: PCT/JP2012/053517
§ 371 (c)(1),
(2), (4) Date: Nov. 8, 2013

(87) PCT Pub. No.: WO2012/160846
PCT Pub. Date: Nov. 29, 2012

(65) Prior Publication Data
US 2014/0097805 A1    Apr. 10, 2014

(30) Foreign Application Priority Data

May 24, 2011   (JP) ................. 2011-115629

(51) Int. Cl.
| | | |
|---|---|---|
| H02P 9/02 | (2006.01) |
| H02P 9/10 | (2006.01) |
| H02P 9/48 | (2006.01) |
| H02J 3/00 | (2006.01) |

(52) U.S. Cl.
CPC .... *H02P 9/02* (2013.01); *H02J 3/00* (2013.01); *H02P 9/107* (2013.01); *H02P 9/48* (2013.01)

(58) Field of Classification Search
CPC ............. H02P 9/02; H02P 9/107; H02P 9/48; H02P 9/00; H02J 7/14
See application file for complete search history.

(56) References Cited

U.S. PATENT DOCUMENTS 4,899,269 A * 2/1990 Rouzies .................... G05F 1/67
                                                           323/906
5,757,164 A * 5/1998 Yoshizaki ............. F01N 3/2026
                                                            322/28

(Continued)

FOREIGN PATENT DOCUMENTS

| JP | 2765716 | 4/1998 |
| JP | 2000 341997 | 12/2000 |
| JP | 2005 269843 | 9/2005 |

OTHER PUBLICATIONS

International Search Report Issued May 22, 2012 in PCT/JP12/053517 Filed Feb. 15, 2012.

(Continued)

*Primary Examiner* — Tulsidas C Patel
*Assistant Examiner* — Viet Nguyen
(74) *Attorney, Agent, or Firm* — Oblon, McClelland, Maier & Neustadt, L.L.P.

(57) ABSTRACT

An electric power supply system includes: an AC generator having a drooping characteristic; a rectification section for converting AC output of the AC generator to DC; a load having an electric storage device supplied with power from the AC generator; and a control section provided between the rectification section and the load. The control section controls the AC generator so that the AC generator operates at predetermined voltage lower than output voltage corresponding to the maximum power operation point of the AC generator.

18 Claims, 16 Drawing Sheets

(56) References Cited

U.S. PATENT DOCUMENTS

| | | | | |
|---|---|---|---|---|
| 6,094,011 | A * | 7/2000 | Notsu | H05B 41/18 307/10.8 |
| 6,348,743 | B1 * | 2/2002 | Sakasai | H02P 9/305 290/40 A |
| 6,717,386 | B1 * | 4/2004 | Kanasugi | G05F 1/66 322/24 |
| 7,045,991 | B2 * | 5/2006 | Nakamura | G05F 1/67 322/10 |
| 8,437,910 | B2 * | 5/2013 | Yoshizawa | B60R 16/03 700/22 |
| 2005/0104377 | A1 * | 5/2005 | Nakagawa | H02P 9/04 290/40 A |
| 2005/0242783 | A1 * | 11/2005 | Nakagawa | H02P 9/06 322/28 |
| 2011/0261597 | A1 * | 10/2011 | Ueno | H02P 9/04 363/37 |
| 2011/0273148 | A1 * | 11/2011 | Ueno | B60L 11/123 322/28 |
| 2014/0021920 | A1 | 1/2014 | Harada et al. | |

OTHER PUBLICATIONS

Combined Office Action and Search Report issued Aug. 6, 2015 in Chinese Patent Application No. 201280025175.7 (with English language translation and English Translation of Category of Cited Documents).

Zhang Hui, "Photovoltaic grid connection power generation reverse conversion technical study" China Masters' Theses Full-text Database, 2009, pp. 14-16 (with Cover Page).

* cited by examiner

ELECTRIC POWER SUPPLY SYSTEM

TECHNICAL FIELD

The present invention relates to an electric power supply system for supplying power generated by an AC generator to a load having an electric storage device.

BACKGROUND ART

In such an electric power supply system for supplying power generated by an AC generator to a load having an electric storage device, the following configuration has been disclosed. That is, the electric power supply system includes: an AC generator having a drooping characteristic in which output voltage decreases along with increase in load while output power increases to become maximum at the maximum power operation point, and then the output voltage further decreases while the output power decreases; and a DC/DC converter as a control section for adjusting the output voltage of the AC generator. Then, the AC generator is controlled so as to operate on the low-current side relative to output current corresponding to the maximum power operation point of the AC generator, that is, on the high-voltage side relative to the output voltage corresponding to the maximum power operation point (for example, see Patent Document 1).

CITATION LIST

Patent Document

Patent Document 1: Japanese Patent No. 4115629 (paragraphs [0014] to [0020], FIG. 1)

SUMMARY OF THE INVENTION

Problems to be Solved by the Invention

In the electric power supply system disclosed in Patent Document 1, the first problem is as follows. That is, the AC generator is controlled so as to operate on the high-voltage side relative to the output voltage corresponding to the maximum power operation point, starting from the maximum voltage that can be outputted by the AC generator, which corresponds to infinity of load. Therefore, input voltage of the control section needs to support the maximum voltage that can be outputted by the AC generator.

In addition, the second problem is as follows. That is, since the input voltage of the control section is always continuously changed from open-circuit voltage of the AC generator, it takes long time until convergence. In addition, since the control is performed while power comparison is constantly performed, ripple current of the AC generator needs to be removed by a low-pass filter or the like in order to perform the power comparison. Therefore, the responsiveness of the input voltage of the control section with respect to load variation cannot be increased.

The present invention has been made to solve the above problems, and an object of the present invention is to provide an electric power supply system capable of suppressing output voltage of an AC generator to be low in order to reduce input voltage of a control section, provide an electric power supply system enabling early convergence of input voltage of a control section, or increase the responsiveness of input voltage of a control section with respect to load variation.

Solution to the Problems

An electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section controls the AC generator so that the AC generator operates at predetermined voltage lower than output voltage corresponding to the maximum power operation point of the AC generator.

Another electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section includes a control circuit having stored therein the relationship between output voltage and output power, which corresponds to the operation state of the AC generator. In addition, the control section feeds back a parameter representing the operation state of the AC generator, predicts the relationship between output voltage and output power of the AC generator in the operation state of the AC generator, and controls the output voltage of the AC generator so that, in the case where load power of the load is smaller than the maximum output power of the AC generator in the operation state of the AC generator, the output voltage starts from voltage that makes the load power of the load and the output power of the AC generator equal to each other, and then converges to constant voltage as time elapses, and in the case where the load power of the load is higher than the maximum output power of the AC generator in the operation state of the AC generator, the output voltage starts from voltage maximizing the output power of the AC generator, and then converges to constant voltage as time elapses.

Still another electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section has generator information about the AC generator stored in a control circuit. In addition, the control section obtains voltage Vm corresponding to the maximum output power of the AC generator by feeding back a parameter representing the operation state of the AC generator, and controls the AC generator so that, in a voltage range not exceeding the voltage Vm, the output voltage of the AC generator converges to constant voltage as time elapses.

Effect of the Invention

An electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section controls the AC generator so that the AC generator operates at predetermined voltage lower than output voltage corresponding to the maximum power operation point of the AC generator. Therefore, the output voltage of the AC generator can be suppressed to be equal to or smaller than predetermined voltage, a switching device with low breakdown voltage can be used in the control section, and the size and loss of the control section can be reduced.

Another electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section includes a control circuit having stored therein the relationship between output voltage and output power, which corresponds to the operation state of the AC generator. In addition, the control section feeds back a parameter representing the operation state of the AC generator, predicts the relationship between output voltage and output power of the AC generator in the operation state of the AC generator, and controls the output voltage of the AC generator so that, in the case where load power of the load is smaller than the maximum output power of the AC generator in the operation state of the AC generator, the output voltage starts from voltage that makes the load power of the load and the output power of the AC generator equal to each other, and then converges to constant voltage as time elapses, and in the case where the load power of the load is higher than the maximum output power of the AC generator in the operation state of the AC generator, the output voltage starts from voltage maximizing the output power of the AC generator, and then converges to constant voltage as time elapses. Therefore, the control can be started also from voltage other than the minimum voltage and the maximum voltage of the control section. Therefore, the control can be started from voltage close to a convergence point, whereby time taken until convergence can be reduced.

Still another electric power supply system according to the present invention includes: an AC generator having a drooping characteristic; a rectification section for converting AC output of the AC generator to DC; a load having an electric storage device supplied with power from the AC generator; and a control section provided between the rectification section and the load. The control section has generator information about the AC generator stored in a control circuit. In addition, the control section obtains voltage Vm corresponding to the maximum output power of the AC generator by feeding back a parameter representing the operation state of the AC generator, and controls the AC generator so that, in a voltage range not exceeding the voltage Vm, the output voltage of the AC generator converges to constant voltage as time elapses. Therefore, the responsiveness of the input voltage of the control section with respect to load variation can be increased.

DESCRIPTION OF EMBODIMENTS

Embodiment 1

Figure 1:
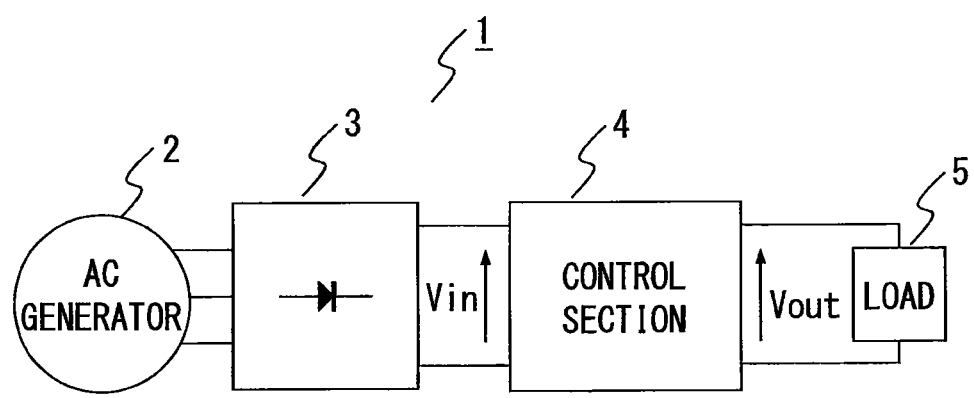
FIG. 1 is a system configuration diagram according to an electric power supply system of embodiment 1 of the present invention.

Embodiment 1 relates to an electric power supply system including: a load having an electric storage device; an AC generator having a drooping characteristic, for supplying generated power to the load; and a control section for controlling the AC generator so that the AC generator operates at predetermined voltage lower than output voltage corresponding to the maximum power operation point of the AC generator.

Hereinafter, the configuration and the operation of embodiment 1 of the present invention will be described based on FIG. 1 which is a system configuration diagram of the electric power supply system, FIG. 2 which is an output voltage-output power characteristic diagram of the AC generator, FIG. 3 which is a configuration diagram of the control section, and FIG. 4 which is a control flowchart of the control section.

First, the configuration of an electric power supply system 1 according to embodiment 1 of the present invention will be described based on the system configuration diagram in FIG. 1.

The electric power supply system 1 is composed of an AC generator 2, a rectification section 3 for converting AC output of the AC generator 2 to DC, and a control section 4 for adjusting DC output of the rectification section 3 and supplying the adjusted power to a load 5 having an electric storage device. Here, input voltage of the control section 4 is defined as Vin and output voltage thereof is defined as Vout.

Figure 2:
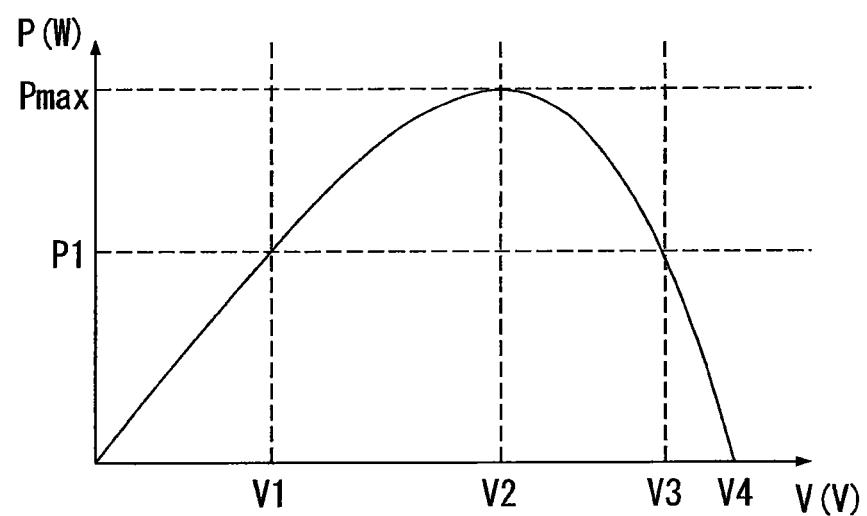
FIG. 2 is an output voltage-output power characteristic diagram of an AC generator according to the electric power supply system of embodiment 1 of the present invention.

The AC generator 2 has a drooping characteristic shown in FIG. 2, with regard to its output voltage and output power. That is, the AC generator 2 has a characteristic in which the output voltage decreases (V4→V3→V2) along with increase in load while the output power increases to become the maximum power (Pmax) at the maximum power operation point at the output voltage V2, and then the output voltage further decreases (V2→V1) while the output power decreases.

In addition, in embodiment 1, for example, a DC/DC converter is assumed as a DC voltage conversion section for adjusting the relationship between the input voltage Vin and the output voltage Vout of the control section 4.

Figure 3:
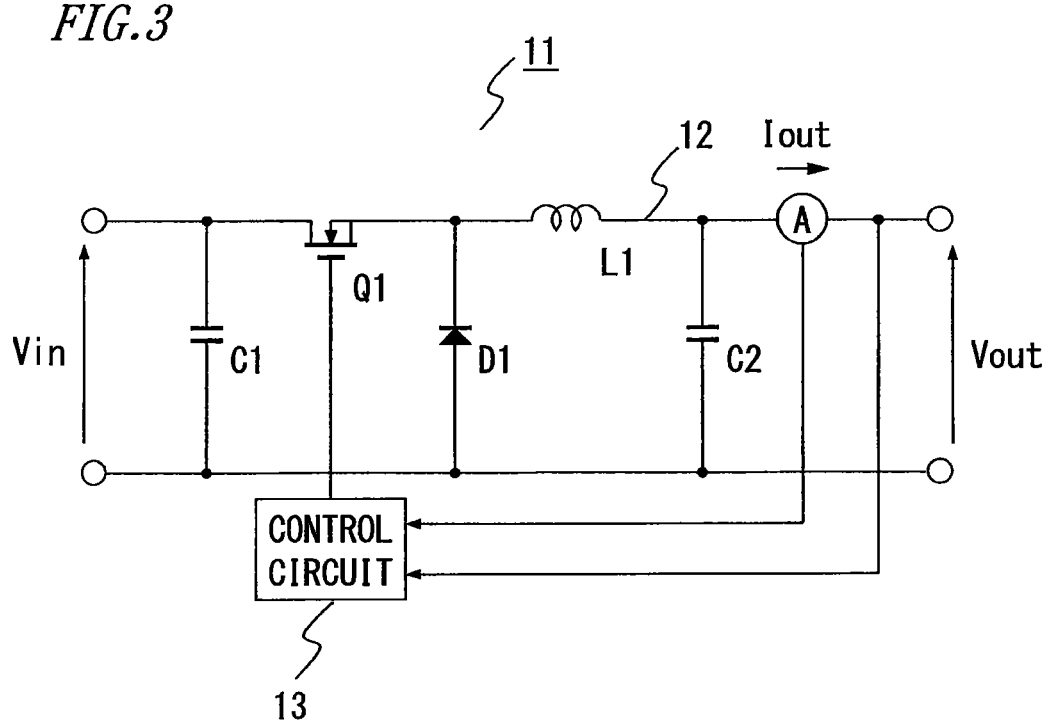
FIG. 3 is a configuration diagram of a control section according to the electric power supply system of embodiment 1 of the present invention.

In embodiment 1, a control section 11 composed of a step-down chopper 12 and a control circuit 13 shown in FIG. 3 is used as an example of the DC voltage conversion section of the control section 4.

The step-down chopper 12 is composed of a field effect transistor (FET) Q1 (hereinafter, referred to as a transistor), a diode D1, a coil L1, and capacitors C1 and C2.

In addition, output voltage Vout and output current Iout of the step-down chopper 12 are inputted to the control circuit 13, and output power Pout of the step-down chopper 12 can be calculated as Vout×Iout.

The relationship among the input voltage Vin, the output voltage Vout, a drive cycle T of the step-down chopper 12, and an ON time ton of the transistor Q1 can be represented by expression (1).

$$Vin = (T/ton)Vout \quad (1)$$

In embodiment 1, using the step-down chopper 12, by changing the ON time ton of the transistor Q1 to adjust the input voltage Vin of the step-down chopper 12, the AC generator 2 can be caused to generate any one of power equal to the power of the load 5, the maximum power that can be generated by the AC generator 2, and the output power Pout determined by the value of Vin obtained when tmin is substituted into ton in expression (1).

Here, tmin is the lower limit value that can be taken by ton, which will be described later.

Next, the operation and the function of the electric power supply system 1 according to embodiment 1 of the present invention will be described with reference to the flowchart in FIG. 4.

For the purpose of simplification of the description and the drawings, the input voltage Vin, the output voltage Vout, the output current Iout, the output power Pout, and the drive cycle T of the step-down chopper 12 may be merely written as Vin, Vout, Iout, Pout, and T, respectively, as necessary.

Target voltage of the output voltage Vout of the step-down chopper 12 is defined as Vref, and a value of Pout one control cycle before the present value of Pout is defined as Pout−1.

In step S1, T is substituted into ton. As a result, as shown in expression (1), Vin starts from Vout which is the lowest voltage that can be controlled by the step-down chopper 12. After step S1, the process proceeds to Step S2.

In step S2, Vout and Iout are acquired, and in step S3, the output power Pout of the step-down chopper 12 is calculated. Pout is almost the same value as the output power of the AC generator 2. After step S3, the process proceeds to step S4.

In step S4, the magnitudes of Pout and Pout−1 which is a value one control cycle before Pout are compared. If Pout is greater than Pout−1, the process proceeds to step S5, and if Pout−1 is greater than Pout, the process proceeds to step S6.

In each of step S5 and step S6, whether or not ton has been shortened in the last control cycle is determined.

Here, if tdown is 1, ton has been shortened at the last time. If tdown is 0, ton is lengthened at the last time.

If Pout is greater than Pout−1 in step S4 and tdown is 1, which means that ton has been shortened in the last control cycle, in step S5, or if Pout−1 is greater than Pout in step S4 and tdown is not 1, which means that ton has been lengthened in the last control cycle, in step S6, the process proceeds to step S7 because Vin has stayed in a voltage range lower than V2 in FIG. 2.

In step S7, whether or not Vout is smaller than the target voltage Vref of Vout is determined. If Vout is smaller than Vref, the process proceeds to step S8 to increase Pout. If Vout is greater than Vref, the process proceeds to step S9 to decrease Pout.

If Pout is greater than Pout−1 in step S4 and tdown is not 1, which means that ton has been lengthened in the last control cycle, in step S5, or if Pout−1 is greater than Pout in step S4 and tdown is 1, which means that ton has been shortened in the last control cycle, in step S6, the process proceeds to step S9 to cause Vin to become lower than V2 in FIG. 2 because Vin has stayed in a voltage range higher than V2 in FIG. 2.

In step S8, ton is shortened, so that Vin increases. After step S8, the process proceeds to step S10.

In step S10, 1 is substituted into tdown because ton has been shortened in step S8. After step S10, the process proceeds to step S12.

In step S12, whether or not ton is smaller than the lower limit value tmin of ton is determined. Unless the lower limit value is set for ton, Vin will increase endlessly. Therefore, the above determination is necessary.

If ton is shorter than tmin, the process proceeds to step S14. If ton is longer than tmin, the process proceeds to step S16.

In step S14, tmin is substituted into ton. After step S14, the process proceeds to step S16.

In step S9, ton is lengthened. As a result, Vin decreases. After step S9, the process proceeds to step S11.

In step S11, 0 is substituted into tdown because ton has been lengthened in step S9. After step S11, the process proceeds to step S13.

In step S13, whether or not ton is greater than T is determined. Unless the upper limit value is set for ton, ton will become greater than T. Therefore, step S13 needs to be provided.

If ton is longer than T, the process proceeds to step S15. If ton is shorter than T, the process proceeds to step S16.

In step S15, T is substituted into ton. After step S15, the process proceeds to step S16.

In step S16, Pout is substituted into Pout−1. After step S16, the process returns to step S2.

By executing the processes of steps S7 to S9, feedback control is performed so that the output voltage of the control section 4 will coincide with the target voltage. Therefore, the output voltage of the AC generator 2 starts from the voltage of the load 5, the output voltage and the output power of the AC generator 2 increase as time elapses in the case where V2 in FIG. 2 is equal to or greater than Vout, and then the output voltage converges to constant voltage.

In the electric power supply system 1 according to embodiment 1, the case where the rectification section 3 and the control section 4 are separately provided has been described. However, the rectification section may be included in the control section.

As described above, in the electric power supply system 1 according to embodiment 1, while the input voltage Vin of the control section 11, i.e. the step-down chopper 12, starts from the output voltage Vout, in a voltage range not exceeding V2 in FIG. 2 in the case where V2 in FIG. 2 is equal to or greater than Vout, the AC generator 2 can be caused to generate any one of power equal to the power of the load 5, the maximum power that can be generated by the AC generator 2, and the output power determined by the value of Vin obtained when tmin is substituted into ton in expression (1). In this case, the output voltage of the AC generator 2 starts from the voltage of the load 5, the output voltage and the output power of the AC generator 2 increase as time elapses, and then the output voltage converges to constant voltage. In addition, in the case where V2 in FIG. 2 is smaller than Vout, the AC generator 2 can be caused to generate the output power determined by Vout.

Therefore, in the electric power supply system 1 according to embodiment 1, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system 1 according to embodiment 1, since the output voltage of the AC generator 2 can be adjusted in a range higher than the voltage of the electric storage device of the load 5, overcharge and over discharge of the electric storage device can be prevented.

Embodiment 2

In an electric power supply system of embodiment 2, the control section 4 is formed by using a step-up chopper.

A system configuration diagram of the electric power supply system according to embodiment 2 is the same as that of the electric power supply system according to embodiment 1 shown in FIG. 1.

Figure 5:
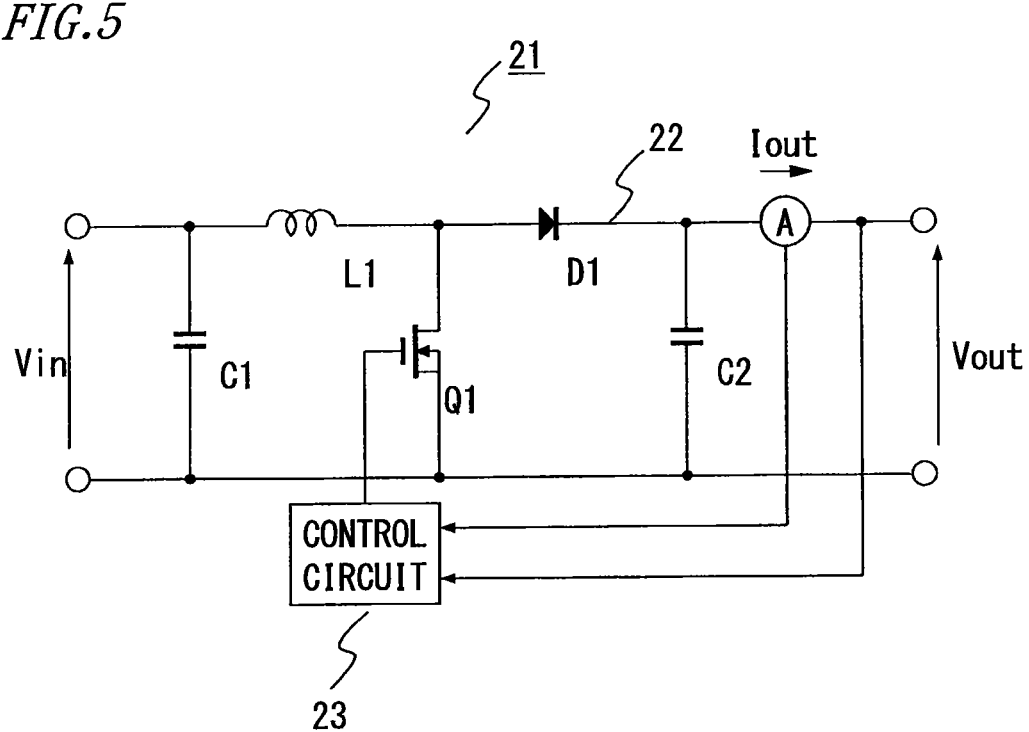
FIG. 5 is a configuration diagram of a control section according to an electric power supply system of embodiment 2 of the present invention.

FIG. 5 is a configuration diagram of a control section of the electric power supply system according to embodiment 2. In FIG. 5, components that are the same as or correspond to those in FIG. 3 are denoted by the same reference characters.

In embodiment 2, a control section 21 composed of a step-up chopper 22 and a control circuit 23 shown in FIG. 5 is used as an example of the DC voltage conversion section of the control section 4.

The step-up chopper 22 is composed of a field effect transistor (FET) Q1 (hereinafter, referred to as a transistor), a diode D1, a coil L1, and capacitors C1 and C2.

In addition, output voltage Vout and output current Iout of the step-up chopper 22 are inputted to the control circuit 23, and output power Pout of the step-up chopper 22 can be calculated as Vout×Iout.

The relationship among the input voltage Vin, the output voltage Vout, a drive cycle T of the step-up chopper 22, and an ON time ton of the transistor Q1 can be represented by expression (2).

$$Vin=(1-ton/T)Vout \qquad (2)$$

In embodiment 2, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

Figure 4:
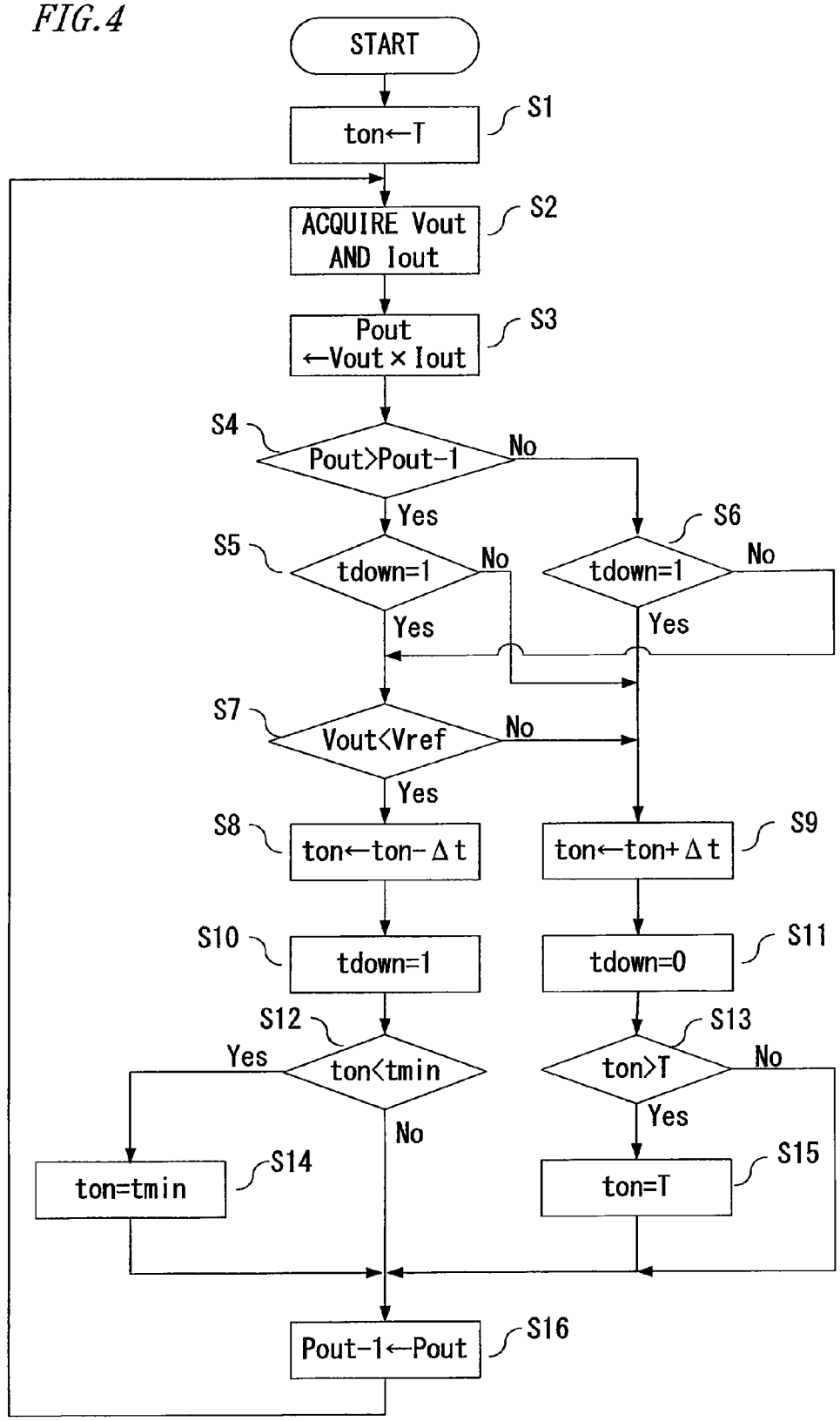
FIG. 4 is a control flowchart of the control section according to the electric power supply system of embodiment 1 of the present invention.

The electric power supply system according to embodiment 2 of the present invention operates based on the flowchart shown in FIG. 4 described in embodiment 1. With regard to the operation and the function of the electric power supply system according to embodiment 2, only a part different from embodiment 1 will be described.

In step S1, T is substituted into ton. As a result, as shown in expression (2), Vin becomes 0, and therefore the input voltage Vin of the step-up chopper 22 starts from 0V.

The description of step S2 and the subsequent steps is the same as that in embodiment 1. By executing the processes of steps S7 to S9, feedback control is performed so that the output voltage of the control section 4 will coincide with the target voltage. Therefore, the output voltage of the AC generator 2 starts from 0V, the output voltage and the output power of the AC generator 2 increase as time elapses, and then the output voltage converges to constant voltage.

As described above, in the electric power supply system according to embodiment 2, while the input voltage Vin of the control section 21, i.e. the step-up chopper 22, starts from 0V, in a voltage range not exceeding V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage and the output power of the AC generator 2 increase as time elapses, and then the output voltage of the AC generator 2 converges to constant voltage. Therefore, in the electric power supply system according to embodiment 2, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system according to embodiment 2, since the output voltage of the AC generator 2 can be adjusted in a range lower than the voltage of the electric storage device of the load 5, overcharge and over discharge of the electric storage device can be prevented.

Embodiment 3

In an electric power supply system of embodiment 3, the control section 4 is formed by using a step-up/down chopper.

A system configuration diagram of the electric power supply system according to embodiment 3 is the same as that of the electric power supply system according to embodiment 1 shown in FIG. 1.

Figure 6:
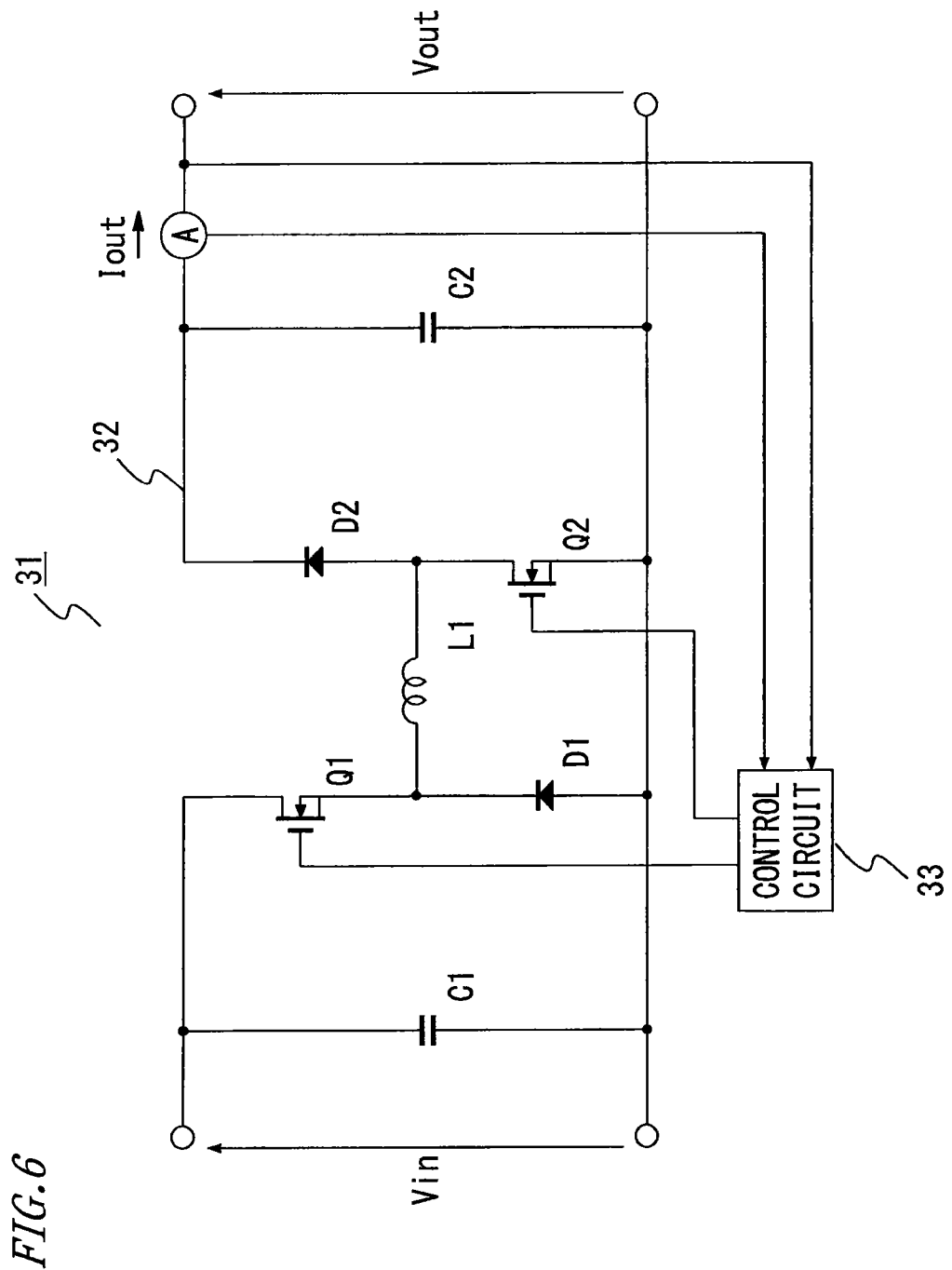
FIG. 6 is a configuration diagram of a control section according to an electric power supply system of embodiment 3 of the present invention.

FIG. 6 is a configuration diagram of a control section of the electric power supply system according to embodiment 3. In FIG. 6, components that are the same as or correspond to those in FIG. 3 are denoted by the same reference characters.

In embodiment 3, a control section 31 composed of a step-up/down chopper 32 and a control circuit 33 shown in FIG. 6 is used as an example of the DC voltage conversion section of the control section 4.

The step-up/down chopper 32 is composed of field effect transistors (FET) Q1 and Q2 (hereinafter, referred to as transistors), diodes D1 and D2, a coil L1, and capacitors C1 and C2.

In the step-up/down chopper 32, the transistors Q1 and Q2 are controlled so as to be turned on or off at the same time.

In addition, output voltage Vout and output current Iout of the step-up/down chopper 32 are inputted to the control circuit 33, and output power Pout of the step-up/down chopper 32 can be calculated as Vout×Iout.

The relationship among the input voltage Vin, the output voltage Vout, a drive cycle T of the step-up/down chopper 32, and an ON time ton of the transistors Q1 and Q2 can be represented by expression (3).

$$Vin=(T/ton-1)Vout \quad (3)$$

In embodiment 3, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 3 of the present invention operates based on the flowchart shown in FIG. 4 described in embodiment 1. With regard to the operation and the function of the electric power supply system according to embodiment 3, only a part different from embodiment 1 will be described.

In step S1, T is substituted into ton. As a result, as shown in expression (3), Vin becomes 0, and therefore the input voltage Vin of the step-up/down chopper 32 starts from 0V.

The description of step S2 and the subsequent steps is the same as that in embodiment 1. By executing the processes of steps S7 to S9, feedback control is performed so that the output voltage of the control section 4 will coincide with the target voltage. Therefore, the output voltage of the AC generator 2 starts from 0V, the output voltage and the output power of the AC generator 2 increase as time elapses, and then the output voltage converges to constant voltage.

As described above, in the electric power supply system according to embodiment 3, while the input voltage Vin of the control section 31, i.e. the step-up/down chopper 32, starts from 0V, in a voltage range not exceeding V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage and the output power of the AC generator 2 increase as time elapses, and then the output voltage of the AC generator 2 converges to constant voltage. Therefore, in the electric power supply system according to embodiment 3, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system according to embodiment 3, since the output voltage of the AC generator 2 can be adjusted in both a higher range and a lower range than the voltage of the electric storage device of the load 5, the degree of freedom in design can be enhanced and overcharge and over discharge of the electric storage device can be prevented.

Embodiment 4

In an electric power supply system of embodiment 4, the configuration of the control section 4 is the same as that in the electric power supply system of embodiment 1, but at the start of control, the input voltage Vin of the step-down chopper starts from predetermined voltage equal to or smaller than the rated input voltage of the control section 4, instead of starting from the output voltage Vout.

A system configuration diagram of the electric power supply system according to embodiment 4 is the same as that of the electric power supply system according to embodiment 1 shown in FIG. 1. In addition, a configuration diagram of the control section is the same as that in FIG. 3, and the step-down chopper 12 is used.

The relationship among the input voltage Vin, the output voltage Vout, a drive cycle T of the step-down chopper 12, and an ON time ton of the transistor Q1 can be represented by expression (1).

In embodiment 4, using the step-down chopper 12, by changing the ON time ton of the transistor Q1 to adjust the input voltage Vin of the step-down chopper 12, the AC generator 2 can be caused to generate any one of power equal to the power of the load 5, the maximum power that can be generated by the AC generator 2, and the output power Pout determined by the value of Vin obtained when tmin is substituted into ton in expression (1).

Next, the operation and the function of the electric power supply system according to embodiment 4 of the present invention will be described, focusing on a part different from embodiments 1 to 3, with reference to a flowchart in FIG. 7.

For the purpose of simplification of the description and the drawings, the input voltage Vin, the output voltage Vout, the output current Iout, the output power Pout, and the drive cycle T of the step-down chopper 12 may be merely written as Vin, Vout, Iout, Pout, and T, respectively, as necessary.

Target voltage of the output voltage Vout of the step-down chopper 12 is defined as Vref, and a value of Pout one control cycle before the present value of Pout is defined as Pout−1.

Figure 7:
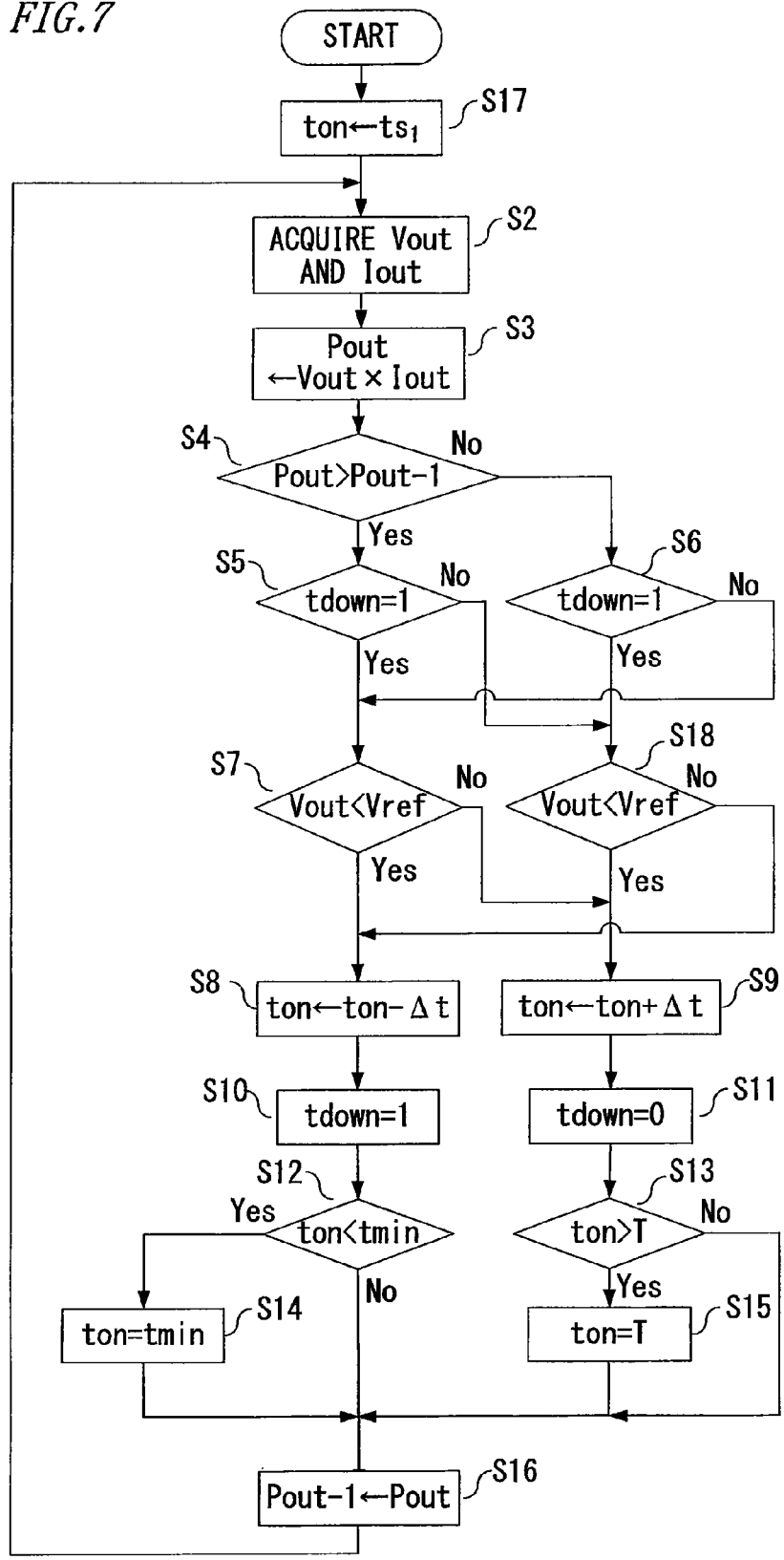
FIG. 7 is a control flowchart of a control section according to an electric power supply system of embodiment 4 of the present invention.

The flowchart in FIG. 4 and the flowchart in FIG. 7 are different in the following points.

Although in step S1 in FIG. 4, T is set as the initial value of ton, in step S17 in FIG. 7, $ts_1$ is substituted into the initial value of ton. Here, $ts_1$ is set to a time such that the value of Vin obtained when $ts_1$ is substituted into ton in expression (1) becomes lower than V4 in FIG. 2 or lower than the rated voltage of the step-down chopper.

In addition, steps S5, S6, and S7 in FIG. 4 are replaced with steps S5, S6, S7, and S18 in FIG. 7.

In step S17, $ts_1$ is substituted into the initial value of ton. Then, the process proceeds to step S2.

Next, flow from step S4 to step S8 or S9 will be described.

If Pout is greater than Pout−1 in step S4 and tdown is 1 in step S5, or if Pout is smaller than Pout−1 in step S4 and tdown is not 1 in step S6, the step-down chopper is operating with the voltage Vin being lower than V2 in FIG. 2. Therefore, if Vout is lower than Vref in step S7, the process proceeds to step S8 to shorten ton so as to increase Vin, thereby increasing the generated power of the AC generator 2.

On the other hand, if Vout is higher than Vref, the process proceeds to step S9 to lengthen ton so as to decrease Vin, thereby decreasing the generated power of the AC generator 2.

If Pout is smaller than Pout−1 in step S4 and tdown is 1 in step S6, or if Pout is greater than Pout−1 in step S4 and tdown is not 1 in step S5, the step-down chopper is operating with the voltage Vin being higher than V2 in FIG. 2. Therefore, if Vout is lower than Vref in step S18, the process proceeds to step S9 to lengthen ton so as to increase Vin, thereby increasing the generated power of the AC generator 2.

On the other hand, if Vout is higher than Vref, the process proceeds to step S8 to shorten ton so as to decrease Vin, thereby decreasing the generated power of the AC generator 2. The other steps are the same as in the flowchart in FIG. 4.

By executing the processes of steps S7, S18, S8, and S9, feedback control is performed so that the output voltage of the control section 4 will coincide with the target voltage. Therefore, the output voltage of the AC generator 2 starts from predetermined voltage equal to or smaller than the rated input voltage of the control section 4, and then converges to constant voltage as time elapses.

In embodiment 4, using the step-down chopper 12, by changing the ON time ton of the transistor Q1 to adjust the input voltage Vin of the step-down chopper 12, while Vin starts from a value obtained when $ts_1$ is substituted into ton in expression (1), in a voltage range not exceeding the value of Vin obtained when tmin is substituted into ton in expression (1), the AC generator 2 can be caused to generate any one of power equal to the power of the load 5, the maximum power that can be generated by the AC generator 2, and the output power determined by the value of Vin obtained when tmin is substituted into ton in expression (1).

As described above, in the electric power supply system according to embodiment 4, while the input voltage Vin of the control section 11, i.e. the step-down chopper 12, starts from predetermined voltage obtained when $ts_1$ is substituted into ton in expression (1), which is equal to or smaller than the rated input voltage of the control section 4, in a voltage range not exceeding the value of Vin obtained when tmin is substituted into ton in expression (1), the AC generator 2 can be caused to generate any one of power equal to the power of the load 5, the maximum power that can be generated by the AC generator 2, and the output power determined by the value of Vin obtained when tmin is substituted into ton in expression (1). In addition, the output voltage of the AC generator 2 converges to constant voltage as time elapses. Therefore, in the electric power supply system according to embodiment 4, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system according to embodiment 4, since the output voltage of the AC generator 2 can be adjusted in a range higher than the voltage of the electric storage device of the load 5, overcharge and over discharge of the electric storage device can be prevented.

Embodiment 5

In an electric power supply system of embodiment 5, the configuration of the control section 4 is the same as that in the electric power supply system of embodiment 2, but at the start of control, the input voltage Vin of the step-up chopper starts from predetermined voltage equal to or smaller than the rated input voltage of the control section 4, instead of starting from 0V.

A system configuration diagram of the electric power supply system according to embodiment 5 is the same as that of the electric power supply system according to embodiment 2 shown in FIG. 1. In addition, a configuration diagram of the control section is the same as that in FIG. 5, and the step-up chopper 22 is used.

The relationship among the input voltage Vin, the output voltage Vout, a drive cycle T of the step-up chopper 22, and an ON time ton of the transistor Q1 can be represented by expression (2).

In embodiment 5, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

The electric power supply system according to embodiment 5 of the present invention operates based on the flowchart shown in FIG. 7 described in embodiment 4. With regard to the operation and the function of the electric power supply system according to embodiment 5, only a part different from embodiment 4 will be described.

In step S17 in FIG. 7, $ts_1$ is substituted into the initial value of ton. Here, $ts_1$ is set to a time such that the value of Vin obtained when $ts_1$ is substituted into ton in expression (2) becomes lower than V4 in FIG. 2 or lower than the rated voltage of the step-up chopper.

The other steps are the same as in embodiment 4. Accordingly, the output voltage of the AC generator 2 starts from predetermined voltage equal to or smaller than the rated input voltage of the control section 4, and then converges to constant voltage as time elapses.

As described above, in the electric power supply system according to embodiment 5, while the input voltage Vin of the control section 21, i.e. the step-up chopper 22, starts from predetermined voltage obtained when $ts_1$ is substituted into ton in expression (2), which is equal to or smaller than the rated input voltage of the control section 4, in a voltage range not exceeding V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage of the AC generator 2 converges to constant voltage as time elapses. Therefore, in the electric power supply system according to embodiment 4, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system according to embodiment 5, since the output voltage of the AC generator 2 can be adjusted in a range lower than the voltage of the electric storage device of the load 5, overcharge and over discharge of the electric storage device can be prevented.

Embodiment 6

In an electric power supply system of embodiment 6, the configuration of the control section 4 is the same as that in the electric power supply system of embodiment 3, but at the start of control, the input voltage Vin of the step-up/down chopper starts from predetermined voltage equal to or smaller than the rated input voltage of the control section 4, instead of starting from 0V.

A system configuration diagram of the electric power supply system according to embodiment 6 is the same as that of the electric power supply system according to embodiment 3 shown in FIG. 1. In addition, a configuration diagram of the control section is the same as that in FIG. 6, and the step-up/down chopper 32 is used.

The relationship among the input voltage Vin, the output voltage Vout, a drive cycle T of the step-up/down chopper 32, and an ON time ton of the transistors Q1 and Q2 can be represented by expression (3).

In embodiment 6, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 6 of the present invention operates based on the flowchart shown in FIG. 7 described in embodiment 4. With regard to the operation and the function of the electric power supply system according to embodiment 6, only a part different from embodiment 4 will be described.

In step S17 in FIG. 7, $ts_1$ is substituted into the initial value of ton. Here, $ts_1$ is set to a time such that the value of Vin obtained when $ts_1$ is substituted into ton in expression (3) becomes lower than V4 in FIG. 2 or lower than the rated voltage of the step-up/down chopper.

The other steps are the same as in embodiment 4. Accordingly, the output voltage of the AC generator 2 starts from predetermined voltage equal to or smaller than the rated input voltage of the control section 4, and then converges to constant voltage as time elapses.

As described above, in the electric power supply system according to embodiment 6, while the input voltage Vin of the control section 31, i.e. the step-up/down chopper 32, starts from predetermined voltage obtained when $ts_1$ is substituted into ton in expression (3), which is equal to or smaller than the rated input voltage of the control section 4, in a voltage range not exceeding V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage of the AC generator 2 converges to constant voltage as time elapses. Therefore, in the electric power supply system according to embodiment 6, since the control section controls the AC generator so that the AC generator operates at predetermined voltage lower than output voltage corresponding to the maximum power operation point of the AC generator, the output voltage of the AC generator 2 can be suppressed to be equal to or smaller than the predetermined voltage, and a switching device with low breakdown voltage can be used in the control section, whereby an effect of reducing the size and loss of the control section is provided.

In addition, in the electric power supply system according to embodiment 6, since the output voltage of the AC generator 2 can be adjusted in both a higher range and a lower range than the voltage of the electric storage device of the load 5, the degree of freedom in design can be enhanced and overcharge and over discharge of the electric storage device can be prevented.

Embodiment 7

Embodiment 7 relates to an electric power supply system which predicts an output voltage-output power characteristic corresponding to the operation state (rotation rate rpm) of an AC generator, thereby enabling adjustment considering the operation state of the AC generator, and takes in load power, thereby further hastening convergence of input voltage of a control section, as compared to the electric power supply system of embodiment 4.

Hereinafter, the configuration and the operation of embodiment 7 of the present invention will be described based on FIG. 8 which is a system configuration diagram of the electric power supply system, FIG. 9 which is an output voltage-output power characteristic diagram using, as a parameter, a rotation rate representing the operation state of the AC generator, and FIG. 10 (first part) and FIG. 11 (second part) which are control flowcharts of the control section. It is noted that the configuration of the control section is the same as that shown in FIG. 3 described in embodiment 4, and the step-down chopper 12 is used.

First, the configuration of an electric power supply system 41 according to embodiment 7 of the present invention will be described based on the system configuration diagram in FIG. 8. In FIG. 8, components that are the same as or correspond to those in FIG. 1 are denoted by the same reference characters.

The configuration of the electric power supply system 41 is different from that of the electric power supply system 1 in that a rotation rate rpm of the AC generator 2 and load power Pload of the load 5 are inputted to a control circuit 42.

Since the step-down chopper 12 is used for the control section 4, the relationship among the input voltage Vin, the output voltage Vout, a drive cycle T of the step-down chopper 12, and an ON time ton of the transistor Q1 can be represented by expression (1).

Figure 8:
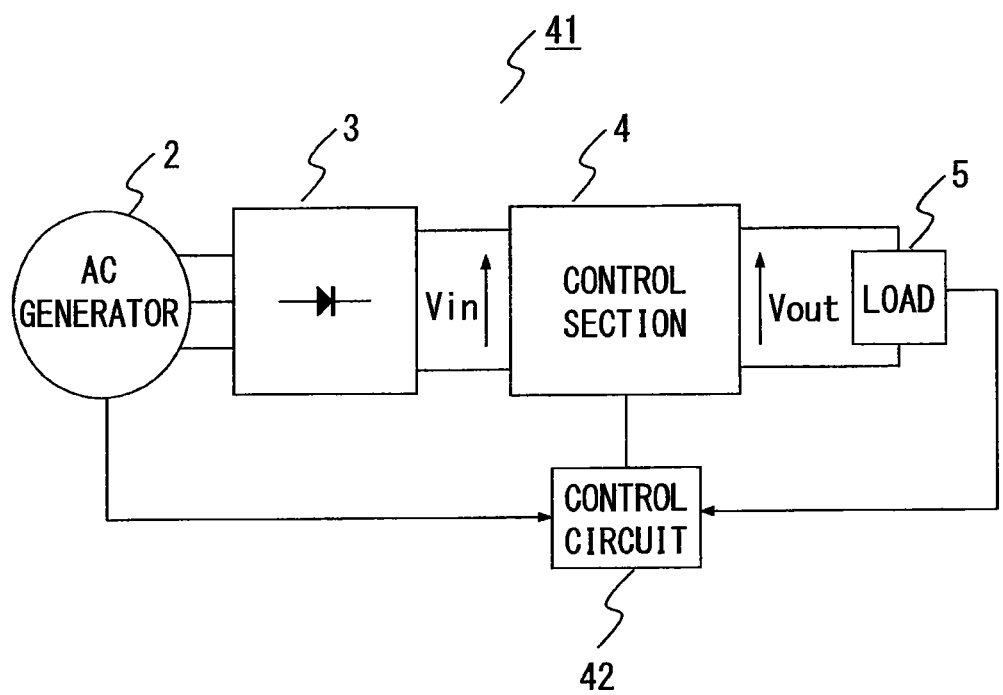
FIG. 8 is a system configuration diagram according to an electric power supply system of embodiment 7 of the present invention.
Figure 9:
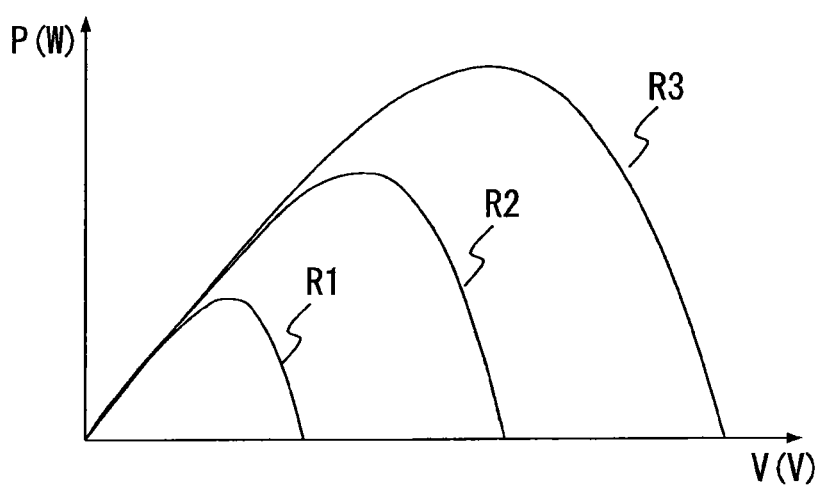
FIG. 9 is an output voltage-output power characteristic diagram of an AC generator according to the electric power supply system of embodiment 7 of the present invention.

It is noted that the control circuit 42 in FIG. 8 and the control circuit 13 in FIG. 3 may be integrated into one control circuit or may be separate control circuits.

Next, FIG. 9 which is the output voltage-output power characteristic diagram using, as a parameter, a rotation rate representing the operation state of the AC generator 2, will be described. In FIG. 9, a characteristic curve R1 indicates an output voltage-output power characteristic upon low-speed rotation, a characteristic curve R2 indicates an output voltage-output power characteristic upon middle-speed rotation, and a characteristic curve R3 indicates an output voltage-output power characteristic upon high-speed rotation.

Upon low-speed rotation, the voltage corresponding to the maximum power and the open-circuit voltage at which the output power is 0 transfer to the low voltage side and the maximum power also decreases, as compared to the case of high-speed rotation.

In embodiment 7, using the step-down chopper 12, by changing the ON time ton of the transistor Q1 to adjust the input voltage Vin of the step-down chopper 12, the AC generator 2 can be caused to generate any one of power equal to the power of the load 5, the maximum power that can be generated by the AC generator 2, and the output power Pout determined by the value of Vin obtained when tmin is substituted into ton in expression (1).

Next, the operation and the function of the electric power supply system 41 according to embodiment 7 of the present invention will be described, focusing on a part different from the flowchart in FIG. 7, with reference to flowcharts in FIGS. 10 and 11.

For the purpose of simplification of the description and the drawings, the input voltage Vin, the output voltage Vout, the output current Iout, the output power Pout, the drive cycle T of the step-down chopper 12, the rotation rate rpm of the AC generator 2, and the load power Pload of the load 5 may be merely written as Vin, Vout, Iout, Pout, and T, rpm, and Pload, respectively, as necessary. In addition, target voltage of the output voltage Vout of the step-down chopper 12 is defined as Vref, and a value of Pout one control cycle before the present value of Pout is defined as Pout−1.

Figure 10:
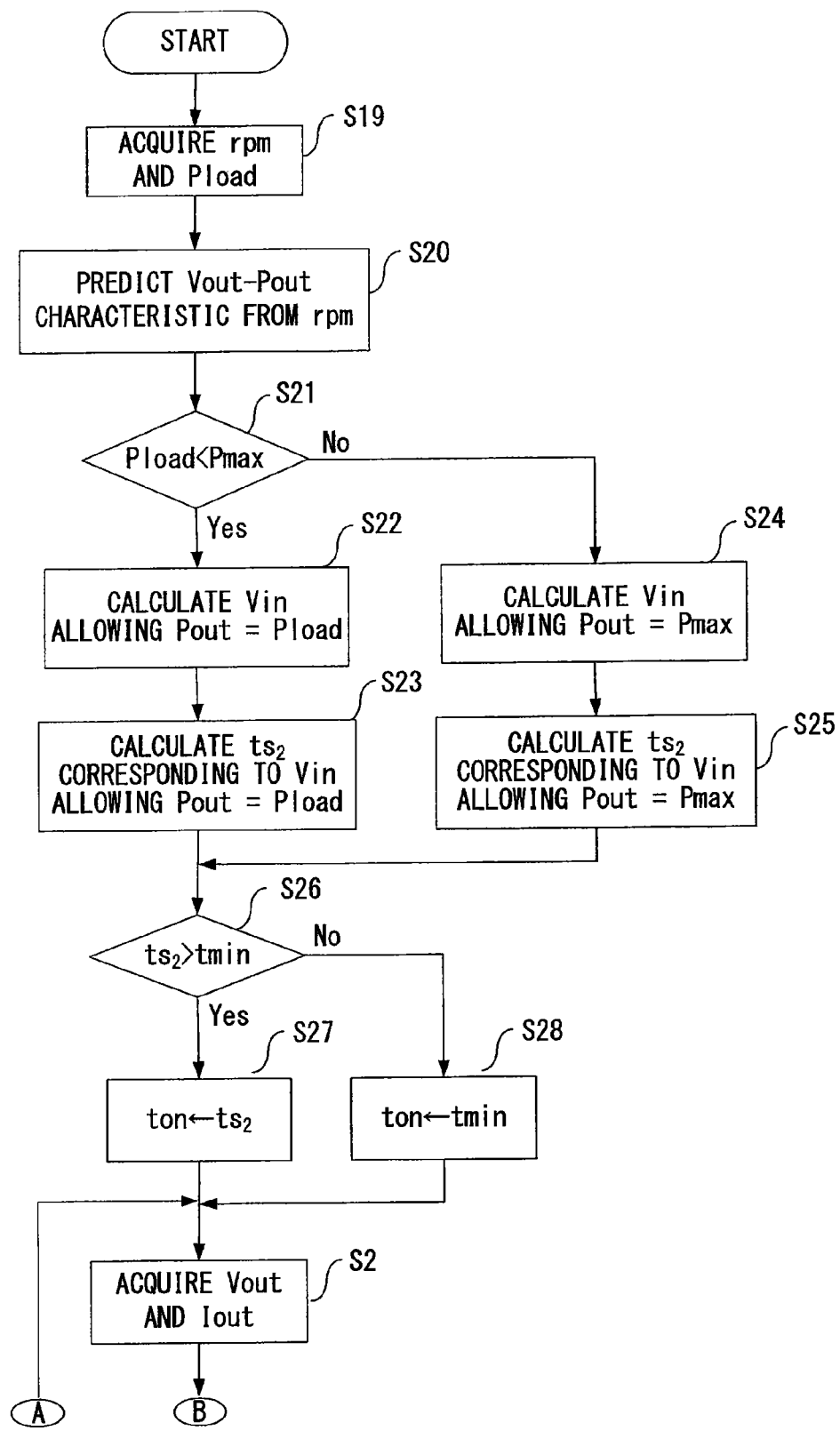
FIG. 10 is a control flowchart (first part) of a control section according to the electric power supply system of embodiment 7 of the present invention.
Figure 11:
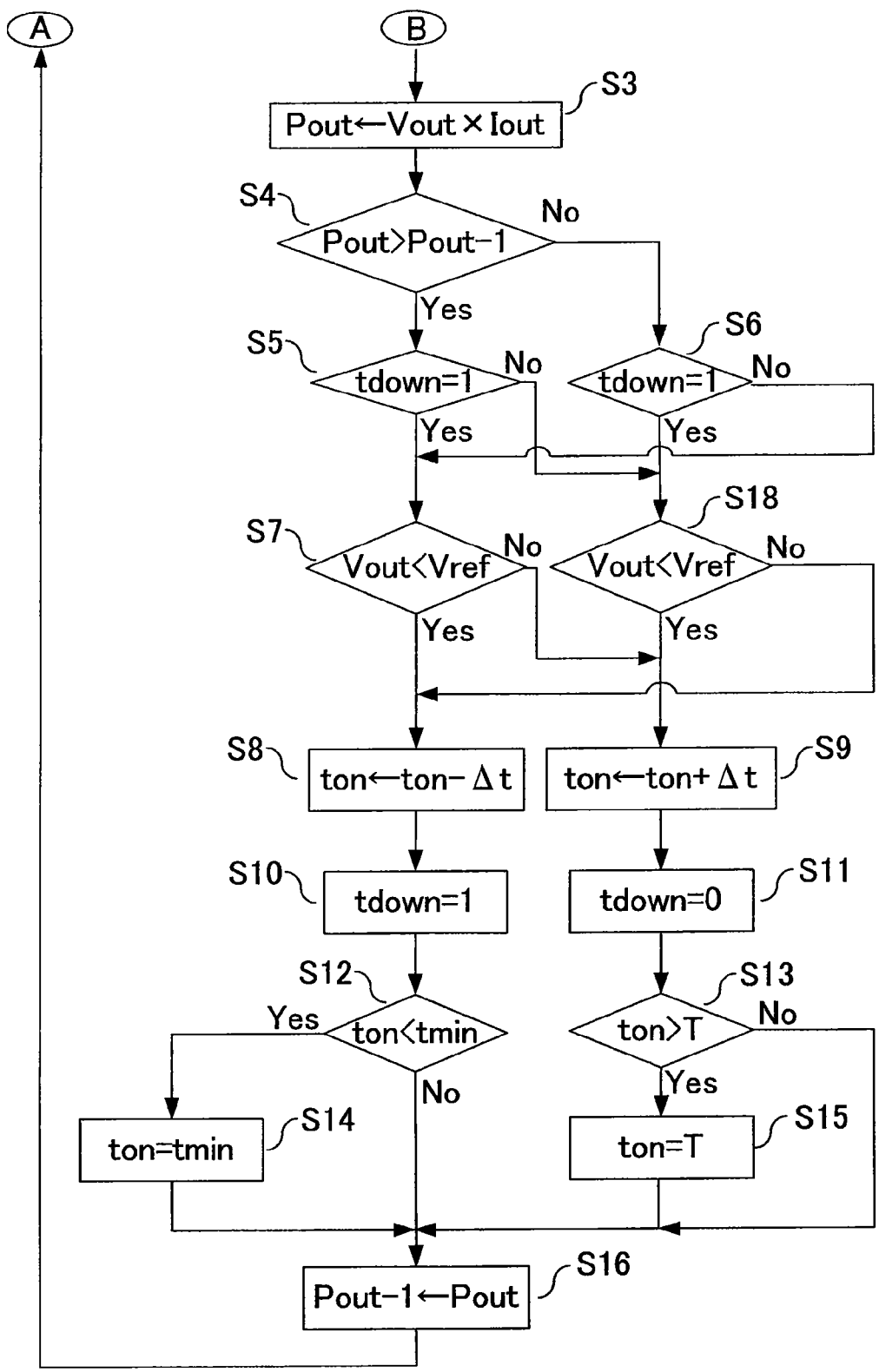
FIG. 11 is a control flowchart (second part) of the control section according to the electric power supply system of embodiment 7 of the present invention.

In the flowcharts in FIGS. 10 and 11, steps that are not included in the flowchart in FIG. 7 are steps S19 to S28.

In step S19, the rotation rate rpm of the AC generator 2 and the load power Pload are acquired. Since the load 5 has an electric storage device, the output power Pout of the control section 4 and the load power Pload do not always coincide with each other. Therefore, the load power Pload is acquired.

In step S20, the output voltage-output power characteristic at the rotation rate rpm of the AC generator 2 is predicted. Here, the control circuit 42 has stored in advance a calculation expression or the like for calculating the relationship between the rotation rate rpm representing the operation state of the AC generator 2 and the output voltage-output power characteristic.

In step S21, whether or not the load power Pload is smaller than maximum power Pmax that can be generated at the rotation rate rpm is determined. If the load power Pload is smaller than the maximum power Pmax that can be generated at the rotation rate rpm, the process proceeds to step S22. If the load power Pload is greater than the maximum power Pmax that can be generated at the rotation rate rpm, the process proceeds to step S24.

In step S22, the value of Vin that makes the output power Pout of the control section 4 and the load power Pload equal to each other is calculated from the output voltage-output power characteristic at the rotation rate rpm of the AC generator 2, predicted in step S20. After step S22, the process proceeds to step S23.

In step S23, the value of Vin that makes the output power Pout of the control section 4 and the load power Pload equal to each other, calculated in step S21, is substituted into expression (1), whereby an ON time $ts_2$ of the transistor Q1 is calculated. After step S23, the process proceeds to step S26.

In step S24, the value of Vin that makes the output power Pout of the control section 4 and the load power Pload equal to each other is calculated from the output voltage-output power characteristic at the rotation rate rpm of the AC generator 2, predicted in step S20. After step S24, the process proceeds to step S25.

In step S25, the value of Vin that makes the output power Pout of the control section 4 and Pmax equal to each other, calculated in step S24, is substituted into expression (1), whereby an ON time $ts_2$ of the transistor Q1 is calculated. After step S25, the process proceeds to step S26.

In step S26, whether or not $ts_2$ is greater than tmin is determined. If $ts_2$ is greater than tmin, the process proceeds to step S27. If $ts_2$ is smaller than tmin, the process proceeds to step S28.

In step S27, $ts_2$ is substituted into ton. After step S27, the process proceeds to step S2.

In step S28, tmin is substituted into ton. After step S28, the process proceeds to step S2.

By the processing of the above-described steps, the control can be started from $ts_2$ corresponding to the value of Vin that makes the output power Pout of the control section 4 and the load power Pload equal to each other.

The subsequent steps are the same as in the flowchart in FIG. 7. Accordingly, the output voltage of the AC generator 2 starts from voltage that makes the output power Pout of the control section 4 and the load power Pload equal to each other, and then converges to constant voltage as time elapses.

As described above, in the electric power supply system according to embodiment 7, while the input voltage Vin of the control section 11, i.e. the step-down chopper 12, starts from the voltage of Vin that makes the output power Pout of the control section 4 and the load power Pload equal to each other, in a voltage range not exceeding the voltage of Vin obtained when tmin is substituted into ton in expression (1), the AC generator 2 can be caused to generate any one of power equal to the power of the load 5, the maximum power that can be generated by the AC generator 2, and the output power determined by the value of Vin obtained when tmin is substituted into ton in expression (1). In addition, the output voltage of the AC generator 2 converges to constant voltage as time elapses. Therefore, in the electric power supply system according to embodiment 7, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 7, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, in the electric power supply system according to embodiment 7, since the control is started from the voltage of Vin that makes the output power Pout of the control section 4 and the load power Pload equal to each other, an effect of hastening convergence of Vin is provided.

Further, in the electric power supply system according to embodiment 7, since the output voltage of the AC generator 2 can be adjusted in a range higher than the voltage of the electric storage device of the load 5, overcharge and over discharge of the electric storage device can be prevented.

It is noted that although the electric power supply system according to embodiment 7 is operated on the low-voltage side relative to the voltage maximizing the generated power of the AC generator 2, the same control can be performed even on the high-voltage side.

Embodiment 8

Embodiment 8 relates to an electric power supply system which predicts an output voltage-output power characteristic corresponding to the operation state (rotation rate rpm) of an AC generator, thereby enabling adjustment considering the operation state, and takes in load power, thereby further hastening convergence of input voltage of a control section, as compared to the electric power supply system of embodiment 5.

A system configuration diagram of the electric power supply system according to embodiment 8 is the same as that of the electric power supply system according to embodiment 5 shown in FIG. 8. In addition, a configuration diagram of the control section is the same as that in FIG. 5, and the step-up chopper 22 is used.

The relationship among the input voltage Vin, the output voltage Vout, a drive cycle T of the step-up chopper 22, and an ON time ton of the transistor Q1 can be represented by expression (2).

In embodiment 8, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

The electric power supply system according to embodiment 8 of the present invention operates based on the flowcharts shown in FIGS. 10 and 11 described in embodiment 7. With regard to the operation and the function of the electric power supply system according to embodiment 8, only a part different from embodiment 7 will be described.

In step S23, the value of Vin that makes the output power Pout of the control section 4 and the load power Pload equal to each other, calculated in step S21, is substituted into expression (2), whereby an ON time $ts_2$ of the transistor Q1 is calculated.

In addition, in step S25, the value of Vin that makes the output power Pout of the control section 4 and Pmax equal to each other, calculated in step S24, is substituted into expression (2), whereby an ON time $ts_2$ of the transistor Q1 is calculated.

The other steps are the same as in embodiment 7. Accordingly, the output voltage of the AC generator 2 starts from the voltage that makes the output power Pout of the control section 4 and the load power Pload equal to each other, and then converges to constant voltage as time elapses.

As described above, in the electric power supply system according to embodiment 8, while the input voltage Vin of the control section 21, i.e. the step-up chopper 22, starts from $ts_2$ that makes the output power Pout of the control section 4 and the load power Pload equal to each other, in a voltage range not exceeding voltage (corresponding to V2 in FIG. 2) corresponding to the maximum power, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage of the AC generator 2 converges to constant voltage as time elapses. Therefore, in the electric power supply system according to embodiment 8, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 8, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, in the electric power supply system according to embodiment 8, since the control is started from the voltage of Vin that makes the output power Pout of the control section 4 and the load power Pload equal to each other, an effect of hastening convergence of Vin is provided.

Further, in the electric power supply system according to embodiment 8, since the output voltage of the AC generator 2 can be adjusted in a range lower than the voltage of the electric storage device of the load 5, overcharge and over discharge of the electric storage device can be prevented.

It is noted that although the electric power supply system according to embodiment 8 is operated on the low-voltage side relative to the voltage maximizing the generated power of the AC generator 2, the same control can be performed even on the high-voltage side.

Embodiment 9

Embodiment 9 relates to an electric power supply system which predicts an output voltage-output power characteristic corresponding to the operation state (rotation rate rpm) of an AC generator, thereby enabling adjustment considering the operation state of the generator, and takes in load power, thereby further hastening convergence of input voltage of a control section, as compared to the electric power supply system of embodiment 6.

A system configuration diagram of the electric power supply system according to embodiment 9 is the same as that of the electric power supply system according to embodiment 6 shown in FIG. 8. In addition, a configuration diagram of the control section is the same as that in FIG. 6, and the step-up/down chopper 32 is used.

The relationship among the input voltage Vin, the output voltage Vout, a drive cycle T of the step-up/down chopper 32, and an ON time ton of the transistor Q1 can be represented by expression (3).

In embodiment 9, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 9 of the present invention operates based on the flowcharts shown in FIGS. 10 and 11 described in embodiment 7. With regard to the operation and the function of the electric power supply system according to embodiment 9, only a part different from embodiment 7 will be described.

In step S23, the value of Vin that makes the output power Pout of the control section 4 and the load power Pload equal to each other, calculated in step S21, is substituted into expression (3), whereby an ON time $ts_2$ of the transistors Q1 and Q2 is calculated.

In addition, in step S25, the value of Vin that makes the output power Pout of the control section 4 and Pmax equal to each other, calculated in step S24, is substituted into expression (3), whereby an ON time $ts_2$ of the transistors Q1 and Q2 is calculated.

The other steps are the same as in embodiment 7. Accordingly, the output voltage of the AC generator 2 starts from the voltage that makes the output power Pout of the control section 4 and the load power Pload equal to each other, and then converges to constant voltage as time elapses.

As described above, in the electric power supply system according to embodiment 9, while the input voltage Vin of the control section 31, i.e. the step-up/down chopper 32, starts from $ts_2$ that makes the output power Pout of the control section 4 and the load power Pload equal to each other, in a voltage range not exceeding voltage (corresponding to V2 in FIG. 2) corresponding to the maximum power, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage of the AC generator 2 converges to constant voltage as time elapses. Therefore, in the electric power supply system according to embodiment 9, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 9, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, in the electric power supply system according to embodiment 9, since the control is started from the voltage of Vin that makes the output power Pout of the control section 4 and the load power Pload equal to each other, an effect of hastening convergence of Vin is provided.

Further, in the electric power supply system according to embodiment 9, since the output voltage of the AC generator 2 can be adjusted in both a higher range and a lower range than the voltage of the electric storage device of the load 5, the degree of freedom in design can be enhanced and overcharge and over discharge of the electric storage device can be prevented.

It is noted that although the electric power supply system according to embodiment 9 is operated on the low-voltage side relative to the voltage maximizing the generated power of the AC generator 2, the same control can be performed even on the high-voltage side.

Embodiment 10

Embodiment 10 relates to an electric power supply system in which a control section further takes in field current If in addition to a rotation rate rpm representing the operation state of an AC generator, thereby also supporting an alternator which is an AC generator requiring field current, and a step-down chopper is used for the control section.

Figure 12:
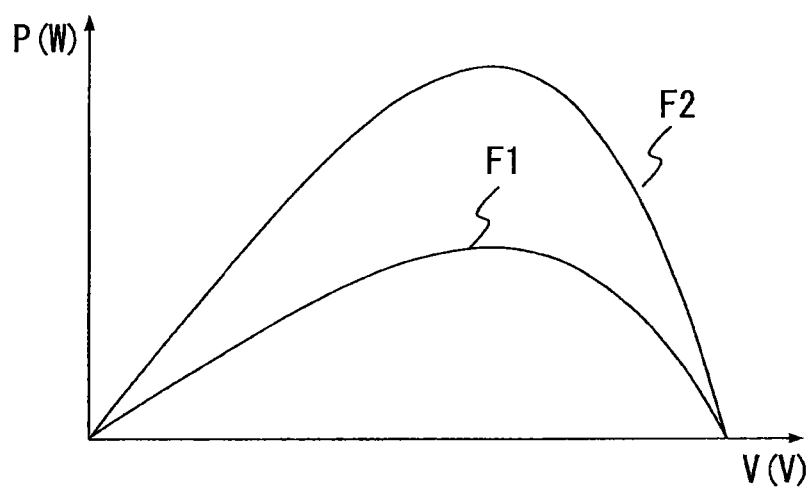
FIG. 12 is an output voltage-output power characteristic diagram of an AC generator according to an electric power supply system of embodiment 10 of the present invention.

Hereinafter, the configuration and the operation of embodiment 10 of the present invention will be described based on FIG. 8 which is a system configuration diagram of the electric power supply system, FIG. 12 which is an output voltage-output power characteristic diagram using, as a parameter, the field current of the AC generator, and FIG. 13 (first part) and FIG. 14 (second part) which are control flowcharts of the control section. It is noted that the configuration of the control section is the same as that shown in FIG. 3 described in embodiment 7, and the step-down chopper 12 is used.

First, the configuration of the electric power supply system according to embodiment 10 of the present invention is the same as the system configuration (FIG. 8) of embodiment 7.

In embodiment 7, the rotation rate rpm representing the operation state is inputted from the AC generator 2 to the control circuit 42. On the other hand, in embodiment 10, in addition to the rotation rate rpm representing the operation state, the field current If is further inputted from the AC generator 2 to the control circuit 42.

It is noted that in embodiment 10, as the AC generator 2, an alternator which is an AC generator requiring field current will be assumed.

Since the step-down chopper 12 is used for the control section 4, the relationship among the input voltage Vin, the output voltage Vout, a drive cycle T of the step-down chopper 12, and an ON time ton of the transistor Q1 can be represented by expression (1).

Next, FIG. 12 which is the output voltage-output power characteristic diagram using, as a parameter, field current representing the operation state of the AC generator 2, will be described. In FIG. 12, a characteristic curve F1 indicates an output voltage-output power characteristic with small field current, and a characteristic curve F2 indicates an output voltage-output power characteristic with large field current.

The voltage corresponding to the maximum power and the open-circuit voltage at which the output power is 0 do not vary depending on the magnitude of the field current. Meanwhile, in the case of small field current, the maximum power that can be generated by the AC generator 2 is small as compared to the case of large field current.

In embodiment 10, using the step-down chopper 12, by changing the ON time ton of the transistor Q1 to adjust the input voltage Vin of the step-down chopper 12, the AC generator 2 can be caused to generate any one of power equal to the power of the load 5, the maximum power that can be generated by the AC generator 2, and the output power Pout determined by the value of Vin obtained when tmin is substituted into ton in expression (1).

Next, the operation and the function of the electric power supply system 41 according to embodiment 10 of the present invention will be described, focusing on a part different from the flowcharts in FIGS. 10 and 11, with reference to flowcharts in FIGS. 13 and 14.

For the purpose of simplification of the description and the drawings, the input voltage Vin, the output voltage Vout, the output current Iout, the output power Pout, and the drive cycle T of the step-down chopper 12, the rotation rate rpm of the AC generator 2, and the load power Pload of the load 5 may be merely written as Vin, Vout, Iout, Pout, and T, rpm, and Pload, respectively, as necessary. In addition, target voltage of the output voltage Vout of the step-down chopper 12 is defined as Vref, and a value of Pout one control cycle before the present value of Pout is defined as Pout−1.

Figure 13:
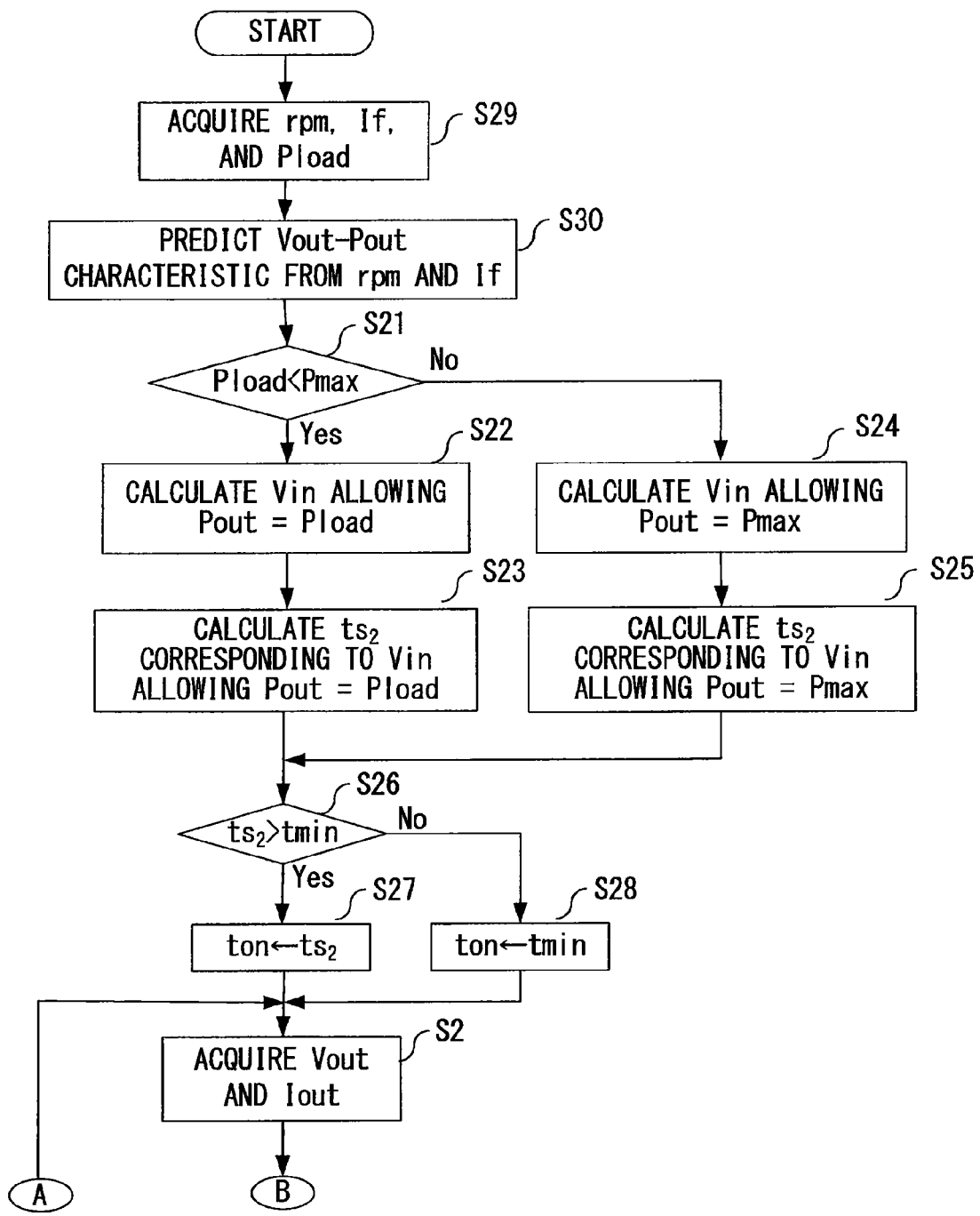
FIG. 13 is a control flowchart (first part) of a control section according to the electric power supply system of embodiment 10 of the present invention.
Figure 14:
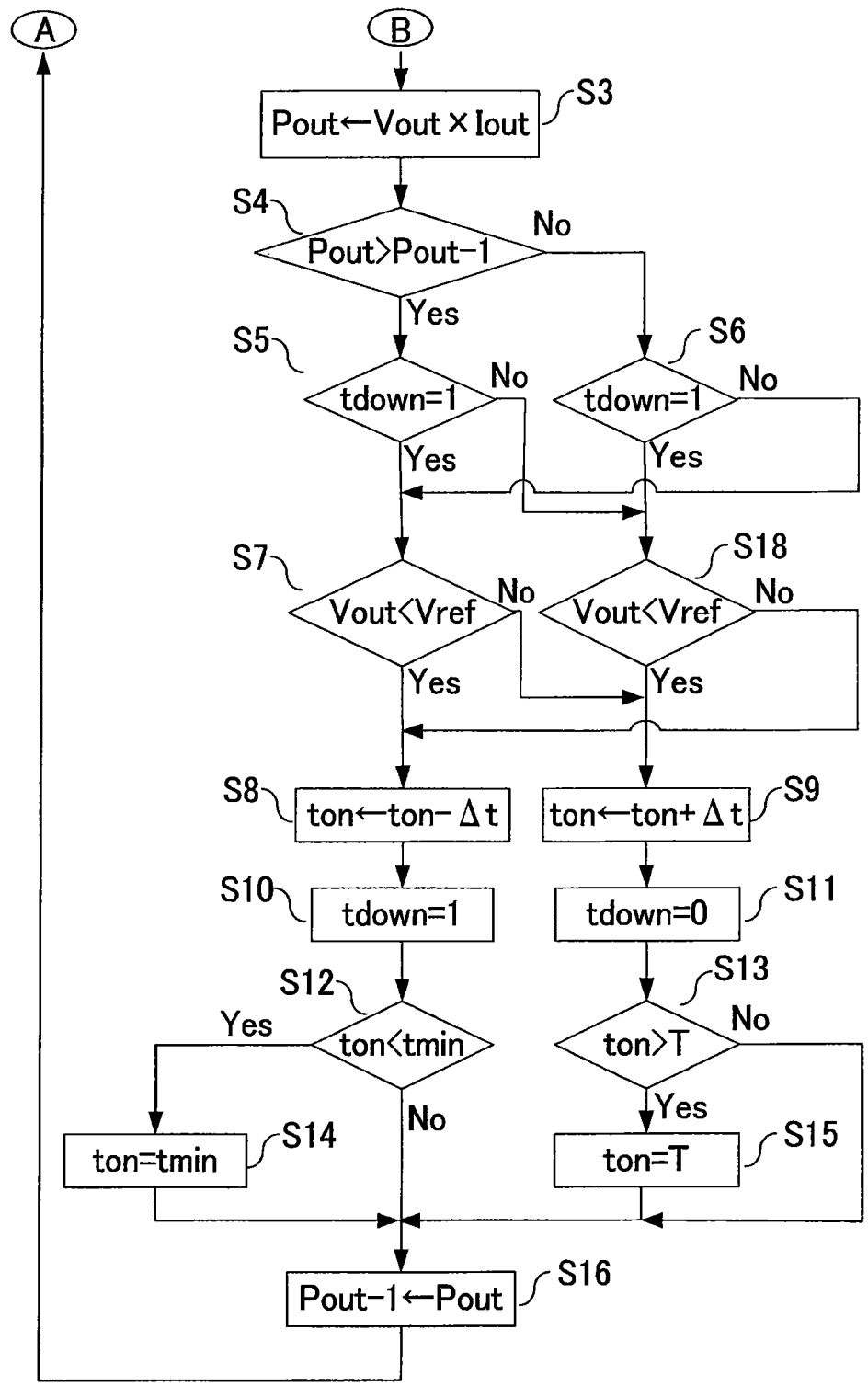
FIG. 14 is a control flowchart (second part) of the control section according to the electric power supply system of embodiment 10 of the present invention.

The flowcharts in FIGS. 13 and 14 are different from those in FIGS. 10 and 11 in that steps S19 and S20 in FIGS. 10 and 11 are replaced with steps S29 and S30 in FIGS. 13 and 14.

In step S29, the field current If of the AC generator 2 is also acquired, together with the rotation rate rpm of the AC generator 2 and the load power Pload of the load 5.

In step S30, the output voltage-output power characteristic of the AC generator 2 is predicted by also using the field current If of the AC generator 2 in addition to the rotation rate rpm of the AC generator 2.

It is noted that the control circuit 42 has stored in advance a calculation expression or the like for calculating the relationship between the rotation rate rpm and the field current If of the AC generator 2 and the output voltage-output power characteristic.

The steps other than steps S29 and S30 are the same as the respective steps of the flowcharts in FIGS. 10 and 11. Accordingly, the output voltage of the AC generator 2 starts from voltage that makes the output power Pout of the control section 4 and the load power Pload equal to each other, and then converges to constant voltage as time elapses.

Upon calculation of $ts_2$ in step S23 or S25, expression (1) is used, thus hastening convergence of the input voltage Vin of the control section 4 even in the AC generator 2 requiring field current.

As described above, in the electric power supply system according to embodiment 10, while the input voltage Vin of the control section 11, i.e. the step-down chopper 12, starts from $ts_2$ that makes the output power Pout of the control section 4 and the load power Pload equal to each other, in a voltage range not exceeding the voltage of Vin obtained when tmin is substituted into ton in expression (1), the AC generator 2 can be caused to generate any one of power equal to the power of the load 5, the maximum power that can be generated by the AC generator 2, and the output power determined by the value of Vin obtained when tmin is substituted into ton in expression (1). In addition, the output voltage of the AC generator 2 converges to constant voltage as time elapses. Therefore, in the electric power supply system according to embodiment 10, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 10, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, the electric power supply system according to embodiment 10 is also applicable to the case where the AC generator 2 is an alternator requiring field current, and since the control is started from the voltage of Vin that makes the output power Pout of the control section 4 and the load power Pload equal to each other, an effect of hastening convergence of Vin is provided.

Further, in the electric power supply system according to embodiment 10, since the output voltage of the AC generator 2 can be adjusted in a range higher than the voltage of the electric storage device of the load 5, overcharge and over discharge of the electric storage device can be prevented.

It is noted that although the electric power supply system according to embodiment 10 is operated on the low-voltage side relative to the voltage maximizing the generated power of the AC generator 2, the same control can be performed even on the high-voltage side.

Embodiment 11

Embodiment 11 relates to an electric power supply system in which a control section further takes in field current If in addition to a rotation rate rpm representing the operation state of an AC generator, thereby also supporting an alternator which is an AC generator requiring field current, and a step-up chopper is used for the control section.

A system configuration diagram of the electric power supply system according to embodiment 11 is the same as that of the electric power supply system according to embodiment 10 shown in FIG. 8. In addition, the configuration of the control section is the same as that in embodiment 8 shown in FIG. 5, and the step-up chopper 22 is used.

The relationship among the input voltage Vin, the output voltage Vout, a drive cycle T of the step-up chopper 22, and an ON time ton of the transistor Q1 can be represented by expression (2).

In embodiment 11, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

The electric power supply system according to embodiment 11 of the present invention operates based on the flowcharts shown in FIGS. 13 and 14 described in embodiment 10. With regard to the operation and the function of the electric power supply system according to embodiment 11, only a part different from embodiment 10 will be described.

Upon calculation of $ts_2$ in step S23 or S25, expression (2) is used, thus hastening convergence of the input voltage Vin of the control section 4 even in the AC generator 2 requiring field current.

The steps other than the above two steps are the same as the respective steps of the flowcharts in embodiment 10. Accordingly, the output voltage of the AC generator 2 starts from voltage that makes the output power Pout of the control section 4 and the load power Pload equal to each other, and then converges to constant voltage as time elapses.

As described above, in the electric power supply system according to embodiment 11, while the input voltage Vin of the control section 21, i.e. the step-up chopper 22, starts from $ts_2$ that makes the output power Pout of the control section 4 and the load power Pload equal to each other, in a voltage range not exceeding voltage (corresponding to V2 in FIG. 2) corresponding to the maximum power, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage of the AC generator 2 converges to constant voltage as time elapses. Therefore, in the electric power supply system according to embodiment 11, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 11, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, the electric power supply system according to embodiment 11 is also applicable to the case where the AC generator 2 is an alternator requiring field current, and since the control is started from the voltage of Vin that makes the output power Pout of the control section 4 and the load power Pload equal to each other, an effect of hastening convergence of Vin is provided.

Further, in the electric power supply system according to embodiment 11, since the output voltage of the AC generator 2 can be adjusted in a range lower than the voltage of the electric storage device of the load 5, overcharge and over discharge of the electric storage device can be prevented.

It is noted that although the electric power supply system according to embodiment 11 is operated on the low-voltage side relative to the voltage maximizing the generated power of the AC generator 2, the same control can be performed even on the high-voltage side.

Embodiment 12

Embodiment 12 relates to an electric power supply system in which a control section further takes in field current If in addition to a rotation rate rpm representing the operation state of an AC generator, thereby also supporting an alternator which is an AC generator requiring field current, and a step-up/down chopper is used for the control section.

A system configuration diagram of the electric power supply system according to embodiment 12 is the same as that of the electric power supply system according to embodiment 10 shown in FIG. 8. In addition, the configuration of the control section is the same as that in embodiment 9 shown in FIG. 6, and the step-up/down chopper 32 is used.

The relationship among the input voltage Vin, the output voltage Vout, a drive cycle T of the step-up/down chopper 32, and an ON time ton of the transistors Q1 and Q2 can be represented by expression (3).

In embodiment 12, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 12 of the present invention operates based on the flowcharts shown in FIGS. 13 and 14 described in embodiment 10. With regard to the operation and the function of the electric power supply system according to embodiment 12, only a part different from embodiment 10 will be described.

Upon calculation of $ts_2$ in step S23 or S25, expression (3) is used, thus hastening convergence of the input voltage Vin of the control section 4 even in the AC generator 2 requiring field current.

The steps other than the above two steps are the same as the respective steps of the flowcharts in embodiment 10. Accordingly, the output voltage of the AC generator 2 starts from voltage that makes the output power Pout of the control section 4 and the load power Pload equal to each other, and then converges to constant voltage as time elapses.

As described above, in the electric power supply system according to embodiment 12, while the input voltage Vin of the control section 31, i.e. the step-up/down chopper 32, starts from $ts_2$ that makes the output power Pout of the control section 4 and the load power Pload equal to each other, in a voltage range not exceeding voltage (corresponding to V2 in FIG. 2) corresponding to the maximum power, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage of the AC generator 2 converges to constant voltage as time elapses. Therefore, in the electric power supply system according to embodiment 12, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 12, the electric generation state of the AC generator is fed back to predict the characteristic of the output power with respect to the output voltage of the AC generator, whereby the control can be started also from voltage other than the minimum voltage and the maximum voltage of the control section. Therefore, the control can be started from voltage close to a convergence point, whereby time taken until convergence can be reduced. Specifically, the electric power supply system according to embodiment 12 is also applicable to the case where the AC generator 2 is an alternator requiring field current, and since the control is started from the voltage of Vin that makes the output power Pout of the control section 4 and the load power Pload equal to each other, an effect of hastening convergence of Vin is provided.

Further, in the electric power supply system according to embodiment 12, since the output voltage of the AC generator 2 can be adjusted in both a higher range and a lower range than the voltage of the electric storage device of the load 5, the degree of freedom in design can be enhanced and overcharge and over discharge of the electric storage device can be prevented.

It is noted that although the electric power supply system according to embodiment 12 is operated on the low-voltage side relative to the voltage maximizing the generated power of the AC generator 2, the same control can be performed even on the high-voltage side.

Embodiment 13

Embodiment 13 relates to an electric power supply system in which a control section calculates voltage corresponding to the maximum output power from generator information about an AC generator and performs control based on the calculated voltage, and a step-down chopper is used for the control section.

Hereinafter, the configuration and the operation of embodiment 13 of the present invention will be described based on FIG. 8 which is a system configuration diagram of the electric power supply system, and FIG. 15 which is a control flowchart of the control section. It is noted that the configuration of the control section is the same as that shown in FIG. 3 described in embodiment 7, and the step-down chopper 12 is used.

In embodiment 10, the rotation rate rpm representing the operation state is inputted from the AC generator 2 to the control circuit 42. On the other hand, in embodiment 13, a pole pair number and an induced voltage constant as the generator information about the AC generator 2 are stored in advance in the control section 4, and further, the rotation rate rpm as the generator information representing the operation state is inputted from the AC generator 2 to the control circuit 42.

Since the step-down chopper 12 is used for the control section 4, the relationship among the input voltage Vin, the output voltage Vout, a drive cycle T of the step-down chopper 12, and an ON time ton of the transistor Q1 can be represented by expression (1).

With regard to the AC generator, if generator information about the rotation rate, the induced voltage constant, and the pole pair number is obtained, voltage corresponding to the maximum output power of the AC generator 2 can be calculated. It is noted that the calculated value of voltage corresponding to the maximum output power of the AC generator 2 slightly deviates from an actual value, due to influence such as temperature or device variation.

It is noted that instead of the rotation rate, the induced voltage constant, and the pole pair number used in embodiment 13, other generator information may be used as the generator information for calculating voltage corresponding to the maximum output power of the AC generator.

Figure 15:
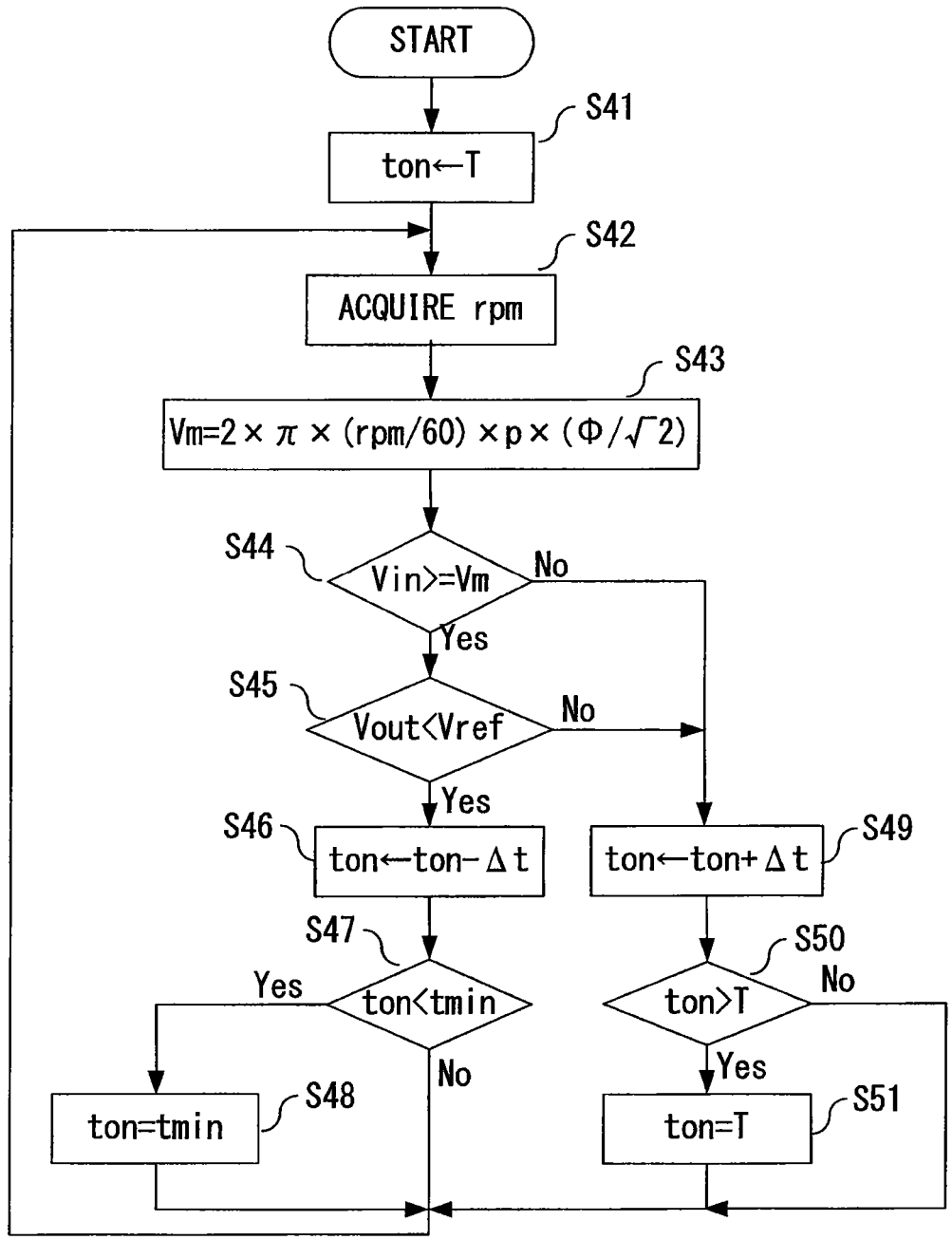
FIG. 15 is a control flowchart of a control section according to an electric power supply system of embodiment 13 of the present invention.

A flowchart of control by the step-down chopper is as shown in FIG. 15.

In step S41, T is substituted into ton. As a result, as shown in expression (1), Vin starts from Vout which is the lowest voltage that can be controlled by the step-down chopper 12.

In step S42, the rotation rate rpm of the AC generator 2 is acquired.

In step S43, voltage Vm corresponding to the maximum output power of the AC generator 2 is calculated. Vm has a value close to V2 in FIG. 2.

Here, p is the pole pair number of the AC generator 2, and φ is the induced voltage constant of the AC generator 2. The expression may differ depending on the characteristic of the AC generator 2 or the characteristic of the load.

In step S44, whether or not the input voltage Vin of the control section 4 is equal to or greater than the voltage Vm corresponding to the maximum output power of the AC generator 2 is determined. If the input voltage Vin of the control section 4 is equal to or greater than the voltage Vm corresponding to the maximum output power of the AC generator 2, the process proceeds to step S45. If the input voltage Vin of the control section 4 is smaller than the voltage Vm, the process proceeds to step S49 to reduce the input voltage Vin of the control section 4.

In step S45, whether or not the output voltage Vout of the control section 4 is smaller than the target value Vref of the output voltage of the control section 4 is determined. If the output voltage Vout of the control section 4 is smaller than the target value Vref of the output voltage of the control section 4, the process proceeds to step S46 to increase the input voltage Vin of the control section 4. If the output voltage Vout of the control section 4 is greater than the target value Vref, the process proceeds to step S49 to reduce the input voltage Vin of the control section 4.

In step S46, the ON time ton of the transistor Q1 is shortened to increase the input voltage Vin of the control section 4.

In steps S47 and S48, the ON time ton of the transistor Q1 is controlled so as not to become smaller than the minimum value tmin of the ON time of the transistor Q1.

In step S49, the ON time ton of the transistor Q1 is lengthened to reduce the input voltage Vin of the control section 4.

In steps S50 and S51, the ON time ton of the transistor Q1 is controlled so as not to become greater than the switching cycle T.

Thus, a step-down chopper is obtained which is capable of, while Vin starts from Vout, in a voltage range not exceeding Vm having a value close to V2 in FIG. 2, causing the AC generator 2 to generate any one of power equal to the power of the load, the maximum power that can be generated by the AC generator 2, and the output power determined by the value of Vin obtained when tmin is substituted into ton in expression (1).

As described above, in the electric power supply system according to embodiment 13, while the input voltage Vin of the control section 11, i.e. the step-down chopper 12, starts from Vout, in a voltage range not exceeding Vm having a value close to V2 in FIG. 2, the AC generator 2 can be caused to generate any one of power equal to the power of the load, the maximum power that can be generated by the AC generator 2, and the output power determined by the value of Vin obtained when tmin is substituted into ton in expression (1). In addition, the output voltage of the AC generator 2 converges to constant voltage as time elapses.

Therefore, in the electric power supply system according to embodiment 13, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 13, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 13, since the output voltage of the AC generator 2 can be adjusted in a range higher than the voltage of the electric storage device of the load 5, overcharge and over discharge of the electric storage device can be prevented.

It is noted that although the electric power supply system according to embodiment 13 is operated on the low-voltage side relative to the voltage maximizing the generated power of the AC generator 2, the same control can be performed even on the high-voltage side.

Embodiment 14

Embodiment 14 relates to an electric power supply system in which a control section calculates voltage corresponding to the maximum output power from generator information about an AC generator and performs control based on the calculated voltage, and a step-up chopper is used for the control section.

A system configuration diagram of the electric power supply system according to embodiment 14 is the same as that of the electric power supply system according to embodiment 13 shown in FIG. 8. In addition, the configuration of the control section is the same as that in embodiment 8 shown in FIG. 5, and the step-up chopper 22 is used.

The relationship among the input voltage Vin, the output voltage Vout, and a drive cycle T of the step-up chopper 22, and an ON time ton of the transistor Q1 can be represented by expression (2).

In embodiment 14, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

The electric power supply system according to embodiment 14 of the present invention operates based on the flowchart shown in FIG. 15 described in embodiment 13. With regard to the operation and the function of the electric power supply system according to embodiment 14, only a part different from embodiment 13 will be described.

In step S41, T is substituted into ton. As a result, as shown in expression (2), Vin becomes 0, and therefore the input voltage Vin of the step-up chopper 22 starts from 0V.

The description of step S42 and the subsequent steps is the same as that of the respective steps of the flowchart in embodiment 13.

By the above processing, a step-up chopper is obtained which is capable of, while Vin starts from 0V, in a voltage range not exceeding Vm having a value close to V2 in FIG. 2, causing the AC generator to generate any one of power equal to the power of the load, the maximum power that can be generated by the AC generator, and the output power determined by the value of Vin obtained when tmin is substituted into ton in expression (2).

As described above, in the electric power supply system according to embodiment 14, while the input voltage Vin of the control section 21, i.e. the step-up chopper 22, starts from 0V, in a voltage range not exceeding Vm having a value close to V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage of the AC generator 2 converges to constant voltage as time elapses.

Therefore, in the electric power supply system according to embodiment 14, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 14, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 14, since the output voltage of the AC generator 2 can be adjusted in a range lower than the voltage of the electric storage device of the load 5, overcharge and over discharge of the electric storage device can be prevented.

It is noted that although the electric power supply system according to embodiment 14 is operated on the low-voltage side relative to the voltage maximizing the generated power of the AC generator 2, the same control can be performed even on the high-voltage side.

Embodiment 15

Embodiment 15 relates to an electric power supply system in which a control section calculates voltage corresponding to the maximum output power from generator information about an AC generator and performs control based on the calculated voltage, and a step-up/down chopper is used for the control section.

A system configuration diagram of the electric power supply system according to embodiment 15 is the same as that of the electric power supply system according to embodiment 13 shown in FIG. 8. In addition, the configuration of the control section is the same as that in embodiment 9 shown in FIG. 6, and the step-up/down chopper 32 is used.

The relationship among the input voltage Vin, the output voltage Vout, a drive cycle T of the step-up/down chopper 32, and an ON time ton of the transistors Q1 and Q2 can be represented by expression (3).

In embodiment 15, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 15 of the present invention operates based on the flowcharts shown in FIGS. 13 and 14 described in embodiment 13. With regard to the operation and the function of the electric power supply system according to embodiment 15, only a part different from embodiment 13 will be described.

In step S41, T is substituted into ton. As a result, as shown in expression (3), Vin becomes 0, and therefore the input voltage Vin of the step-up/down chopper 32 starts from 0V.

The description of step S42 and the subsequent steps is the same as that of the respective steps of the flowchart in embodiment 13.

By the above processing, a step-up/down chopper is obtained which is capable of, while Vin starts from 0V, in a voltage range not exceeding Vm having a value close to V2 in FIG. 2, causing the AC generator to generate any one of power equal to the power of the load, the maximum power that can be generated by the AC generator, and the output power determined by the value of Vin obtained when tmin is substituted into ton in expression (3).

As described above, in the electric power supply system according to embodiment 15, while the input voltage Vin of the control section 31, i.e. the step-up/down chopper 32, starts from 0V, in a voltage range not exceeding Vm having a value close to V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage of the AC generator 2 converges to constant voltage as time elapses. Therefore, in the electric power supply system according to embodiment 15, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 15, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 15, since the output voltage of the AC generator 2 can be adjusted in both a higher range and a lower range than the voltage of the electric storage device of the load 5, the degree of freedom in design can be enhanced and overcharge and over discharge of the electric storage device can be prevented.

It is noted that although the electric power supply system according to embodiment 15 is operated on the low-voltage side relative to the voltage maximizing the generated power of the AC generator 2, the same control can be performed even on the high-voltage side.

Embodiment 16

Embodiment 16 relates to an electric power supply system in which a control section calculates voltage corresponding to the maximum output power from generator information about an AC generator and performs PID control, and a step-down chopper is used for the control section.

Hereinafter, the configuration and the operation of embodiment 16 of the present invention will be described based on FIG. 8 which is a system configuration diagram of the electric power supply system, and FIG. 16 which is a control flowchart of the control section. It is noted that the configuration of the control section is the same as that shown in FIG. 3 described in embodiment 7, and the step-down chopper 12 is used.

In embodiment 16, a pole pair number and an induced voltage constant as the generator information about the AC generator 2, and further, generator information for calculating a control constant needed for PID control, are stored in advance in the control section 4. In addition, the rotation rate rpm as the generator information representing the operation state is inputted from the AC generator 2 to the control circuit 42.

Since the step-down chopper 12 is used for the control section 4, the relationship among the input voltage Vin, the output voltage Vout, a drive cycle T of the step-down chopper 12, and an ON time ton of the transistor Q1 can be represented by expression (1).

In order to perform PID control for the AC generator, a proportion term P, an integral term I, and a differential term D are needed. These can be calculated from a proportion term gain Kp, an integral term gain Ki, and a differential term gain Kd which are generator information about the AC generator.

Therefore, the generator information (the proportion term gain Kp, the integral term gain Ki, and the differential term gain Kd) of the AC generator 2 are stored in advance in the control section 4.

In embodiment 16, the case of controlling the AC generator 2 by PI control will be described as an example.

Figure 16:
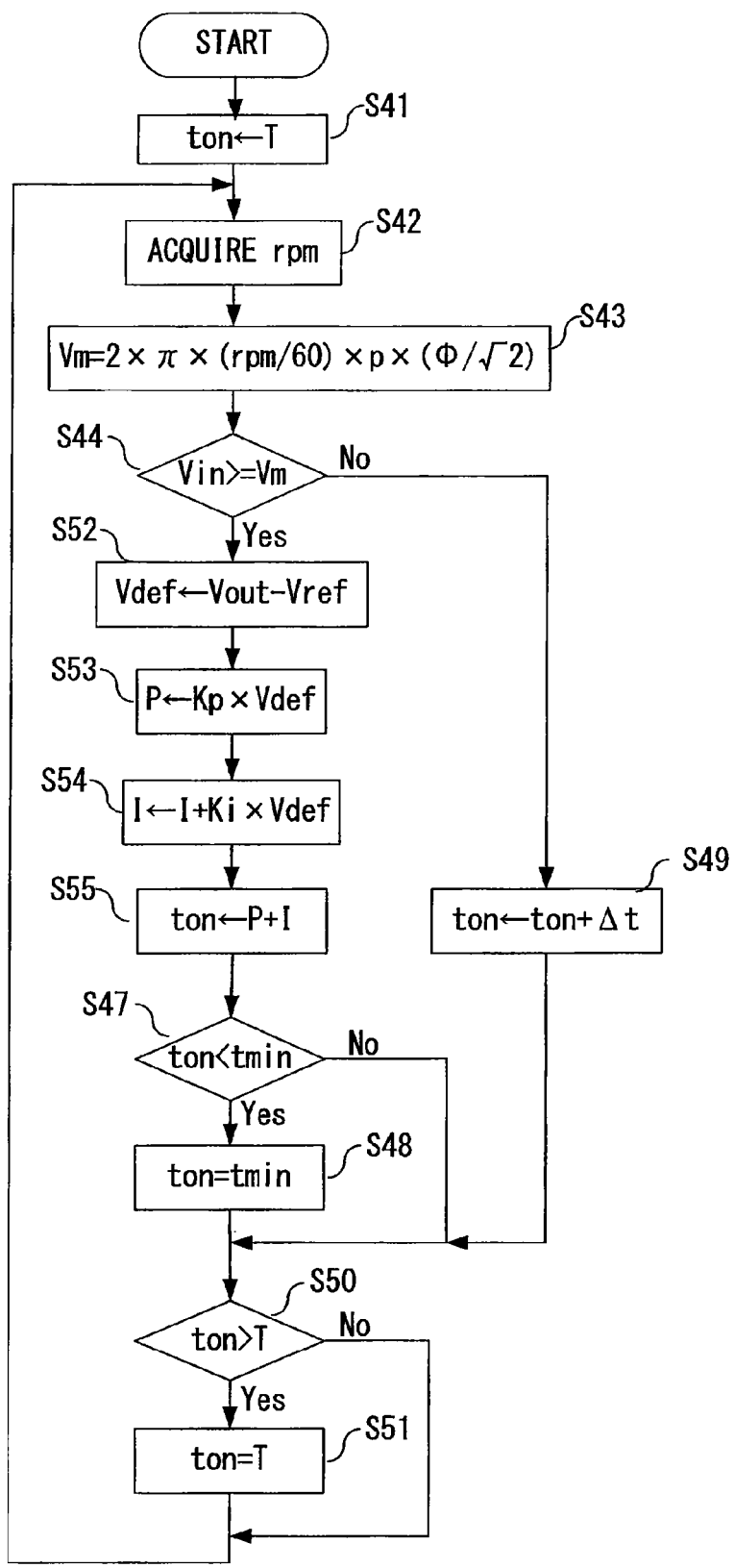
FIG. 16 is a control flowchart of a control section according to an electric power supply system of embodiment 16 of the present invention.

A flowchart of control by the step-down chopper is as shown in FIG. 16.

In step S41, T is substituted into ton. As a result, as shown in expression (1), Vin starts from Vout which is the lowest voltage that can be controlled by the step-down chopper 12.

In step S42, the rotation rate rpm of the AC generator 2 is acquired.

In step S43, voltage Vm corresponding to the maximum output power of the AC generator 2 is calculated. Vm has a value close to V2 in FIG. 2.

In step S44, whether or not the input voltage Vin of the control section 4 is equal to or greater than the voltage Vm corresponding to the maximum output power of the AC generator 2 is determined. If the input voltage Vin of the control section 4 is equal to or greater than the voltage Vm corresponding to the maximum output power of the AC generator 2, the process proceeds to step S52. If the input voltage Vin of the control section 4 is smaller than the voltage Vm, the process proceeds to step S49 to reduce the input voltage Vin of the control section 4.

In step S49, the ON time ton of the transistor Q1 is lengthened to reduce the input voltage Vin of the control section 4.

In step S52, Vdef which is the deviation between the output voltage Vout of the control section 4 and the target value Vref of the output voltage of the control section 4, is calculated.

In step S53, the proportion term P (Kp×Vdef) of PI control is calculated from Vdef. In step S54, the integral term I (I+Ki×Vdef) of PI control is calculated from Vdef.

In step S55, the ON time ton (P+I) of Q1 is calculated from the proportion term P and the integral term I.

By processing of steps S47 and S48 or steps S50 and S51, ton is controlled so as to fall within a range from tmin to T.

By the above processing, a step-down chopper is obtained which is capable of, while Vin starts from Vout, in a voltage range not exceeding Vm having a value close to V2 in FIG. 2, causing the AC generator 2 to generate any one of power equal to the power of the load, the maximum power that can be generated by the AC generator 2, and the output power determined by the value of Vin obtained when tmin is substituted into ton in expression (1).

It is noted that instead of PI control used in embodiment 16, PID control may be used. In this case, the differential term D can be calculated as $D=Kd \times (Vdef_{(n)} - Vdef_{(n-1)})$. In this case, step S55 is represented as (ton←P+I+D).

Here, $Vdef_{(n-1)}$ denotes the value of Vdef at the last time.

As described above, in the electric power supply system according to embodiment 16, while the input voltage Vin of the control section 11, i.e. the step-down chopper 12, starts from Vout, in a voltage range not exceeding Vm having a value close to V2 in FIG. 2, the AC generator 2 can be caused to generate any one of power equal to the power of the load, the maximum power that can be generated by the AC generator 2, and the output power determined by the value of Vin obtained when tmin is substituted into ton in expression (1). In addition, the output voltage of the AC generator 2 converges to constant voltage as time elapses.

Therefore, in the electric power supply system according to embodiment 16, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 16, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 16, since the output voltage of the AC generator 2 can be adjusted in a range higher than the voltage of the electric storage device of the load 5, overcharge and overdischarge of the electric storage device can be prevented.

It is noted that although the electric power supply system according to embodiment 16 is operated on the low-voltage side relative to the voltage maximizing the generated power of the AC generator 2, the same control can be performed even on the high-voltage side.

Embodiment 17

Embodiment 17 relates to an electric power supply system in which a control section calculates voltage corresponding to the maximum output power from generator information about an AC generator and performs PID control, and a step-up chopper is used for the control section.

A system configuration diagram of the electric power supply system according to embodiment 17 is the same as that of the electric power supply system according to embodiment 16 shown in FIG. 8. In addition, the configuration of the control section is the same as that in embodiment 8 shown in FIG. 5, and the step-up chopper 22 is used.

The relationship among the input voltage Vin, the output voltage Vout, a drive cycle T of the step-up chopper 22, and an ON time ton of the transistor Q1 can be represented by expression (2).

In embodiment 17, using the step-up chopper 22, by changing the ON time ton of the transistor Q1 to adjust the input voltage Vin of the step-up chopper 22, the AC generator 2 can be caused to generate any one of power equal to the power of the load 5, the maximum power that can be generated by the AC generator 2, and the output power Pout determined by the value of Vin obtained when tmin is substituted into ton in expression (2).

The electric power supply system according to embodiment 17 of the present invention operates based on the flowchart shown in FIG. 16 described in embodiment 16. With regard to the operation and the function of the electric power supply system according to embodiment 17, only a part different from embodiment 16 will be described.

In step S41, T is substituted into ton. As a result, as shown in expression (2), Vin becomes 0, and therefore the input voltage Vin of the step-up chopper 22 starts from 0V.

The description of step S42 and the subsequent steps is the same as that of the respective steps of the flowchart in embodiment 16.

By the above processing, a step-up chopper is obtained which is capable of, while Vin starts from 0V, in a voltage range not exceeding Vm having a value close to V2 in FIG. 2, causing the AC generator to generate any one of power equal to the power of the load, the maximum power that can be generated by the AC generator, and the output power determined by the value of Vin obtained when tmin is substituted into ton in expression (2).

As described above, in the electric power supply system according to embodiment 17, while the input voltage Vin of the control section 21, i.e. the step-up chopper 22, starts from 0V, in a voltage range not exceeding Vm having a value close to V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (2). In addition, the output voltage of the AC generator 2 converges to constant voltage as time elapses.

Therefore, in the electric power supply system according to embodiment 17, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 17, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 17, since the output voltage of the AC generator 2 can be adjusted in a range lower than the voltage of the electric storage device of the load 5, overcharge and over discharge of the electric storage device can be prevented.

It is noted that although the electric power supply system according to embodiment 17 is operated on the low-voltage side relative to the voltage maximizing the generated power of the AC generator 2, the same control can be performed even on the high-voltage side.

Embodiment 18

Embodiment 18 relates to an electric power supply system in which a control section calculates voltage corresponding to the maximum output power from generator information about an AC generator and performs PID control, and a step-up/down chopper is used for the control section.

A system configuration diagram of the electric power supply system according to embodiment 18 is the same as that of the electric power supply system according to embodiment 16 shown in FIG. 8. In addition, the configuration of the control section is the same as that in embodiment 9 shown in FIG. 6, and the step-up/down chopper 32 is used.

The relationship among the input voltage Vin, the output voltage Vout, a drive cycle T of the step-up/down chopper 32, and an ON time ton of the transistors Q1 and Q2 can be represented by expression (3).

In embodiment 18, using the step-up/down chopper 32, by changing the ON time ton of the transistors Q1 and Q2 to adjust the input voltage Vin of the step-up/down chopper 32, the AC generator 2 can be caused to generate any one of power equal to the power of the load 5, the maximum power that can be generated by the AC generator 2, and the output power Pout determined by the value of Vin obtained when tmin is substituted into ton in expression (3).

The electric power supply system according to embodiment 18 of the present invention operates based on the flowchart shown in FIG. 16 described in embodiment 16. With regard to the operation and the function of the electric power supply system according to embodiment 18, only a part different from embodiment 16 will be described.

In step S41, T is substituted into ton. As a result, as shown in expression (3), Vin becomes 0, and therefore the input voltage Vin of the step-up/down chopper 32 starts from 0V.

The description of step S42 and the subsequent steps is the same as that of the respective steps of the flowchart in embodiment 16.

By the above processing, a step-up/down chopper is obtained which is capable of, while Vin starts from 0V, in a voltage range not exceeding Vm having a value close to V2 in FIG. 2, causing the AC generator to generate any one of power equal to the power of the load, the maximum power that can be generated by the AC generator, and the output power determined by the value of Vin obtained when tmin is substituted into ton in expression (3).

As described above, in the electric power supply system according to embodiment 18, while the input voltage Vin of the control section 31, i.e. the step-up/down chopper 32, starts from 0V, in a voltage range not exceeding Vm having a value close to V2 in FIG. 2, the AC generator 2 can be caused to generate any one of power equal to the power of the load 5, the maximum power that can be generated by the AC generator 2, and the output power determined by the value of Vin obtained when tmin is substituted into ton in expression (3). In addition, the output voltage of the AC generator 2 converges to constant voltage as time elapses. Therefore, in the electric power supply system according to embodiment 18, the output voltage of the AC generator 2 can be suppressed to be equal to or smaller than predetermined voltage, and a switching device with low breakdown voltage can be used in the control section, whereby an effect of reducing the size and loss of the control section is provided.

In addition, in the electric power supply system according to embodiment 18, since the electric generation state of the AC generator is fed back to predict the output voltage with respect to the maximum generated power of the AC generator, the responsiveness of the input voltage of the control section with respect to load variation can be increased.

Further, in the electric power supply system according to embodiment 18, since the output voltage of the AC generator 2 can be adjusted in both a higher range and a lower range than the voltage of the electric storage device of the load 5, the degree of freedom of design increases and overcharge and over discharge of the electric storage device can be prevented.

It is noted that although the electric power supply system according to embodiment 18 is operated on the low-voltage side relative to the voltage maximizing the generated power of the AC generator 2, the same control can be performed even on the high-voltage side.

It is noted that, within the scope of the present invention, the above embodiments may be freely combined with each other, or each of the above embodiments may be modified or abbreviated as appropriate.

INDUSTRIAL APPLICABILITY

The present invention relates to a system for supplying power generated by an AC generator to a load having an electric storage device, and is applicable to a wide variety of electric power supply systems.

The invention claimed is:
1. An electric power supply system comprising:
an AC generator having a drooping characteristic;
a rectification section for converting AC output of the AC generator to DC;

a load having an electric storage device supplied with power from the AC generator; and a control section provided between the rectification section and the load, wherein the control section controls the AC generator so that the AC generator operates at a predetermined voltage lower than an output voltage corresponding to a maximum power operation point of the AC generator, and the control section controls the output voltage of the AC generator so that the output voltage starts from a voltage equal to or smaller than a rated input voltage of the control section, and then the output voltage of the AC generator converges to a constant voltage lower than the output voltage corresponding to the maximum power operation point of the AC generator as time elapses.

2. The electric power supply system according to claim 1, wherein the control section performs the control so that the output voltage of the AC generator starts from voltage of the load, the output voltage and output power of the AC generator increase as time elapses, and then the output voltage of the AC generator converges to the constant voltage.

3. The electric power supply system according to claim 1, wherein the control section controls the output voltage of the AC generator so that the output voltage starts from 0V, the output voltage and output power of the AC generator increase as time elapses, and then the output voltage of the AC generator converges to the constant voltage.

4. The electric power supply system according to claim 1, wherein the control section includes a DC voltage conversion section for reducing output voltage of the rectification section and supplying the resultant output voltage to the load, and performs feedback control so that the output voltage of the DC voltage conversion section coincides with a target voltage.

5. The electric power supply system according to claim 1, wherein the control section includes a DC voltage conversion section for increasing output voltage of the rectification section and supplying the resultant output voltage to the load, and performs feedback control so that the output voltage of the DC voltage conversion section coincides with a target voltage.

6. The electric power supply system according to claim 1, wherein the control section includes a DC voltage conversion section for reducing or increasing output voltage of the rectification section and supplying the resultant output voltage to the load, and performs feedback control so that the output voltage of the DC voltage conversion section coincides with a target voltage.

7. An electric power supply system comprising:
an AC generator having a drooping characteristic;
a rectification section for converting AC output of the AC generator to DC;
a load having an electric storage device supplied with power from the AC generator; and
a control section provided between the rectification section and the load, wherein
the control section includes a control circuit having stored therein the relationship between output voltage and output power, which corresponds to an operation state of the AC generator, and
the control section feeds back a parameter representing the operation state of the AC generator, predicts the relationship between output voltage and output power of the AC generator in the operation state of the AC generator, and controls the output voltage of the AC generator so that, in the case where load power of the load is smaller than the maximum output power of the AC generator in the operation state of the AC generator, the output voltage starts from voltage that makes the load power of the load and the output power of the AC generator equal to each other, and then converges to constant voltage as time elapses, and in the case where the load power of the load is higher than the maximum output power of the AC generator in the operation state of the AC generator, the output voltage starts from voltage maximizing the output power of the AC generator, and then converges to constant voltage as time elapses.

8. The electric power supply system according to claim 7, wherein the parameter representing the operation state of the AC generator is a rotation rate of the AC generator.

9. The electric power supply system according to claim 7, wherein the parameter representing the operation state of the AC generator is field current of the AC generator.

10. An electric power supply system comprising:
an AC generator having a drooping characteristic;
a rectification section for converting AC output of the AC generator to DC;
a load having an electric storage device supplied with power from the AC generator; and
a control section provided between the rectification section and the load, wherein
the control section has generator information about the AC generator stored in a control circuit,
the control section obtains voltage Vm corresponding to the maximum output power of the AC generator by feeding back a parameter representing an operation state of the AC generator, and controls, in a voltage range not exceeding the voltage Vm, the output voltage of the AC generator so that the output voltage converges to constant voltage as time elapses, and
the control section controls the output voltage of the AC generator so that the output voltage starts from a voltage equal to or smaller than a rated input voltage of the control section, and then converges to a constant voltage as time elapses.

11. The electric power supply system according to claim 7, wherein the control section includes a DC voltage conversion section for reducing output voltage of the rectification section and supplying the resultant output voltage to the load, and performs feedback control so that the output voltage of the DC voltage conversion section coincides with a target voltage.

12. The electric power supply system according to claim 7, wherein the control section includes a DC voltage conversion section for increasing output voltage of the rectification section and supplying the resultant output voltage to the load, and performs feedback control so that the output voltage of the DC voltage conversion section coincides with a target voltage.

13. The electric power supply system according to claim 7, wherein the control section includes a DC voltage conversion section for reducing or increasing output voltage of the rectification section and supplying the resultant output voltage to the load, and performs feedback control so that the output voltage of the DC voltage conversion section coincides with a target voltage.

14. The electric power supply system according to claim 10, wherein the control section performs the control so that the output voltage of the AC generator starts from voltage of the load, the output voltage and output power of the AC generator increase as time elapses, and then the output voltage of the AC generator converges to the constant voltage.

15. The electric power supply system according to claim 10, wherein the control section controls the output voltage of the AC generator so that the output voltage starts from 0V, the output voltage and output power of the AC generator increase as time elapses, and then the output voltage of the AC generator converges to the constant voltage.

16. The electric power supply system according to claim 10, wherein the control section includes a DC voltage conversion section for reducing output voltage of the rectification section and supplying the resultant output voltage to the load, and performs feedback control so that the output voltage of the DC voltage conversion section coincides with a target voltage.

17. The electric power supply system according to claim 10, wherein the control section includes a DC voltage conversion section for increasing output voltage of the rectification section and supplying the resultant output voltage to the load, and performs feedback control so that the output voltage of the DC voltage conversion section coincides with a target voltage.

18. The electric power supply system according to claim 10, wherein the control section includes a DC voltage conversion section for reducing or increasing output voltage of the rectification section and supplying the resultant output voltage to the load, and performs feedback control so that the output voltage of the DC voltage conversion section coincides with a target voltage.

\* \* \* \* \*